United States Patent
Hall et al.

(10) Patent No.: US 10,429,935 B2
(45) Date of Patent: Oct. 1, 2019

(54) TREMOR CORRECTION FOR GESTURE RECOGNITION

(71) Applicant: Comcast Cable Communications, LLC, Philadelphia, PA (US)

(72) Inventors: Jeffrey Allen Hall, Aurora, CO (US); Edward David Monnerat, Highlands Ranch, CO (US)

(73) Assignee: Comcast Cable Communications, LLC, Philadelphia, PA (US)

(*) Notice: Subject to any disclaimer, the term of this patent is extended or adjusted under 35 U.S.C. 154(b) by 48 days.

(21) Appl. No.: 15/017,979

(22) Filed: Feb. 8, 2016

(65) Prior Publication Data
US 2017/0228025 A1    Aug. 10, 2017

(51) Int. Cl.
*G06F 3/01* (2006.01)

(52) U.S. Cl.
CPC .................... *G06F 3/017* (2013.01)

(58) Field of Classification Search
CPC ......... G06F 2203/013; G06F 2203/014; G06F 2203/015; G06F 3/011; G06F 3/012; G06F 3/013; G06F 3/014; G06F 3/016; G06F 3/0416; G06F 3/0418; G06F 3/017
USPC ........................................................ 345/156
See application file for complete search history.

(56) References Cited

U.S. PATENT DOCUMENTS

| 5,293,879 | A | 3/1994 | Vonk et al. | |
|---|---|---|---|---|
| 6,561,993 | B2 * | 5/2003 | Adapathya | A61B 5/1101 345/163 |
| 6,963,937 | B1 * | 11/2005 | Kamper | G06F 3/038 345/156 |
| 7,158,118 | B2 * | 1/2007 | Liberty | G06F 3/017 345/156 |

(Continued)

FOREIGN PATENT DOCUMENTS

EP    2305506 A1    4/2011

OTHER PUBLICATIONS

Motti, Lilian Genaro, Nadine Vigouroux, and Philippe Gorce. "Interaction techniques for older adults using touchscreen devices: a literature review." Proceedings of the 25th IEME conference francophone on l'Interaction Homme-Machine. ACM, 2013.

(Continued)

*Primary Examiner* — Grant Sitta
(74) *Attorney, Agent, or Firm* — Banner & Witcoff, Ltd.

(57) ABSTRACT

Motion detection computing devices may have difficulty determining precise motions of a user who suffers from unintended movement, such as tremors, associated with a physical or medical condition. Aspects described herein relate to motion compensation for detected motion input, e.g., 3D motion, from such users. As described herein, a system may detect the presence of rhythmic motion and/or other input characteristics within captured motion input from a user. The system may determine one or more filters to apply to the captured motion input based on the rhythmic (Continued)

motion, other input characteristics, and/or information in a user profile. The one or more filters may be applied to the captured motion input in order to suppress or minimize the effects of the rhythmic motion and/or other input characteristics thereby resulting in an enhanced user experience in an interactive system, such as a 3D, virtual and/or augmented reality environment.

19 Claims, 9 Drawing Sheets

(56) References Cited

U.S. PATENT DOCUMENTS

| | | | |
|---|---|---|---|
| 7,194,702 B1 | 3/2007 | Peasley | |
| 7,236,156 B2* | 6/2007 | Liberty | A61B 5/1171 345/158 |
| 7,239,301 B2* | 7/2007 | Liberty | G06F 1/3215 345/158 |
| 7,535,456 B2* | 5/2009 | Liberty | G06F 3/017 345/157 |
| 7,557,794 B2 | 7/2009 | Rosenberg et al. | |
| 7,665,041 B2 | 2/2010 | Wilson et al. | |
| 7,768,504 B2 | 8/2010 | Rosenberg et al. | |
| 8,040,382 B2 | 10/2011 | Kahn et al. | |
| 8,180,209 B2 | 5/2012 | Gallagher et al. | |
| 8,638,989 B2 | 1/2014 | Holz | |
| 2004/0151218 A1 | 8/2004 | Branzoi et al. | |
| 2005/0213840 A1 | 9/2005 | Chen | |
| 2005/0231520 A1 | 10/2005 | Forest | |
| 2006/0017692 A1* | 1/2006 | Wehrenberg | G06F 1/1616 345/156 |
| 2006/0028446 A1* | 2/2006 | Liberty | G06F 3/017 345/158 |
| 2007/0247435 A1 | 10/2007 | Benko et al. | |
| 2008/0055259 A1 | 3/2008 | Plocher | |
| 2009/0228841 A1 | 9/2009 | Hildreth | |
| 2010/0063630 A1 | 3/2010 | Sutherland et al. | |
| 2010/0324437 A1 | 12/2010 | Freeman et al. | |
| 2011/0289456 A1* | 11/2011 | Reville | G06F 3/011 715/830 |
| 2012/0032882 A1 | 2/2012 | Schlachta et al. | |
| 2012/0059867 A1* | 3/2012 | Okamori | G06F 9/5044 709/201 |
| 2012/0122574 A1* | 5/2012 | Fitzpatrick | G06T 13/40 463/31 |
| 2012/0236025 A1 | 9/2012 | Jacobsen et al. | |
| 2012/0311570 A1* | 12/2012 | Gandhi | G06F 9/5027 718/1 |
| 2013/0265218 A1* | 10/2013 | Moscarillo | G06F 3/017 345/156 |
| 2014/0035827 A1 | 2/2014 | Hyde et al. | |
| 2014/0191955 A1* | 7/2014 | Raffa | G06F 1/1694 345/156 |
| 2014/0201689 A1 | 7/2014 | Bedikian et al. | |
| 2014/0240466 A1 | 8/2014 | Holz | |
| 2014/0285434 A1 | 9/2014 | Gritton | |
| 2015/0242008 A1* | 8/2015 | Beckman | G06F 3/043 345/177 |
| 2016/0125705 A1* | 5/2016 | Hurtig | G06F 3/017 340/4.11 |

OTHER PUBLICATIONS

Starner, Thad, et al. "The gesture pendant: A self-illuminating, wearable, infrared computer vision system for home automation control and medical monitoring." Wearable computers, the fourth international symposium on. IEEE, 2000.

Soran, Bilge, et al. "Tremor detection using motion filtering and SVM." Pattern Recognition (ICPR), 2012 21st International Conference on. IEEE, 2012.

Weichert, Frank, et al. "Analysis of the accuracy and robustness of the leap motion controller." Sensors 13.5 (2013): 6380-6393.

Strachan, Steven, and Roderick Murray-Smith. "Muscle tremor as an input mechanism." Proc. UIST. vol. 2. 2004.

Wacharamanotham, Chat, et al. "Designing a touchscreen web browser for people with tremors." Wksp on Mobile Accessibility, CHI 13, 2013.

Nicolau, Hugo, and Joaquim Jorge. "Elderly text-entry performance on touchscreens." Proceedings of the 14th international ACM SIGACCESS conference on Computers and accessibility. ACM, 2012.

Chris Smith. "Tracking Hand Tremors with Leap Motion", Leap Motion, Inc., Jul. 1, 2014, 10 pages.

uWand, You Direct the SmartTV, Phillips, 20 pages, 2013.

Goel, Mayank, Leah Findlater, and Jacob Wobbrock. "WalkType: using accelerometer data to accomodate situational impairments in mobile touch screen text entry." Proceedings of the SIGCHI Conference on Human Factors in Computing Systems. ACM, 2012.

\* cited by examiner

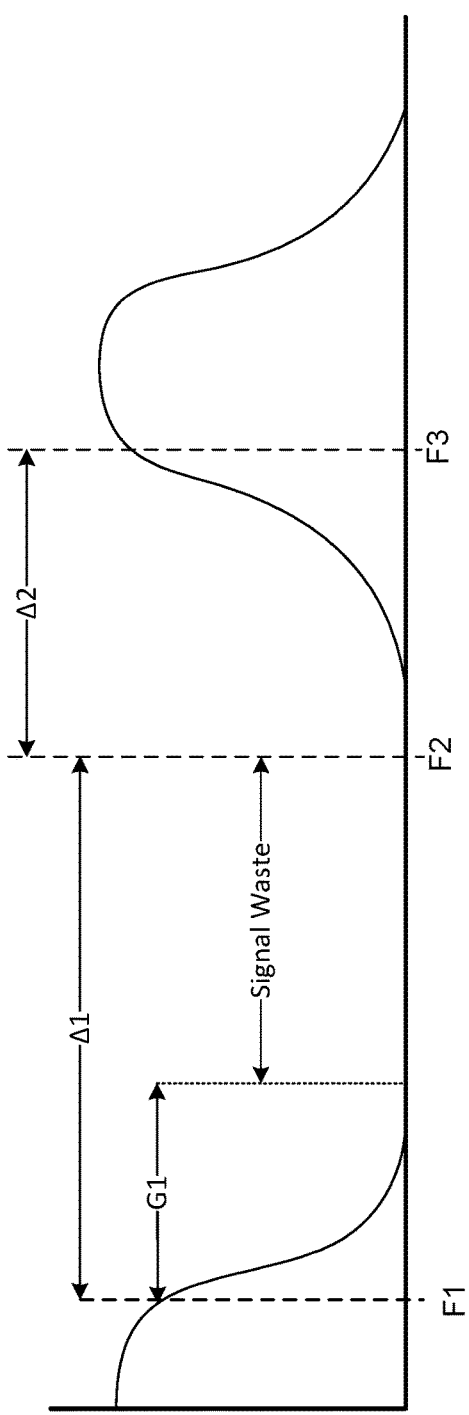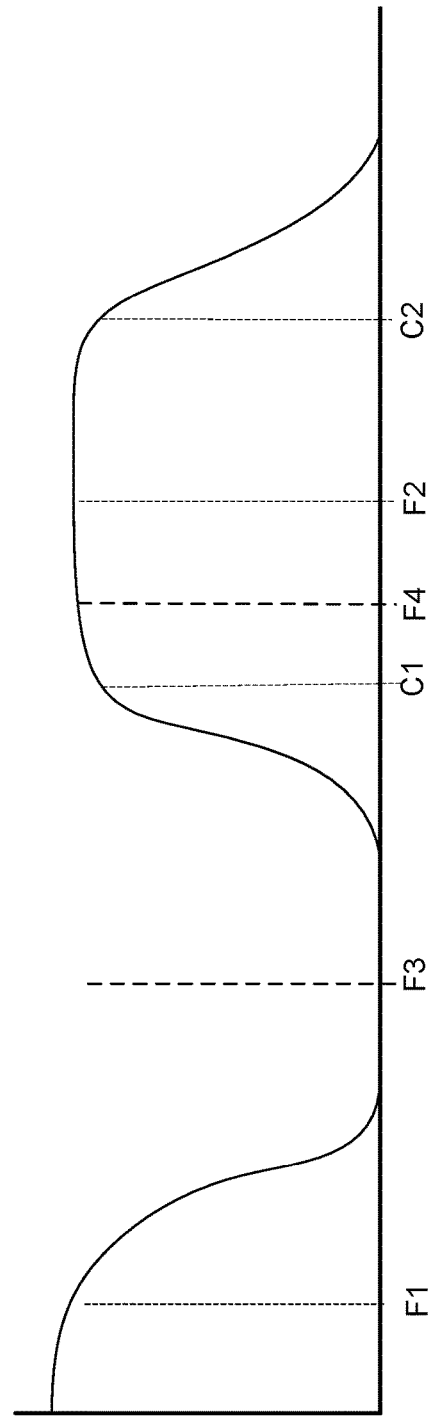

TREMOR CORRECTION FOR GESTURE RECOGNITION

BACKGROUND

Today, various three dimensional ("3D") motion capture or movement recognition devices are gaining popularity in increasingly diverse fields, ranging from video games and virtual reality systems to automatic control systems in industry. Unfortunately many people are afflicted with conditions that impair physical abilities, conditions such as Parkinson's disease, which negatively affect their fine motor abilities. Potential users may experience tremors, or unintended motions, when trying to carry out simple or complex physical tasks. Such motions may make it difficult for motion capture systems to determine a user's intended gestures. Given the ever present need for accurate user input detection techniques, aspects of the disclosure address improvements in the accuracy of user input detection.

SUMMARY

The following summary is for illustrative purposes only, and is not intended to limit or constrain the detailed description.

Motion detecting computing devices, such as devices that detect motion in a 3D environment, may have difficulty determining the precise motion of a user who suffers from tremors associated with being tired, injured, or a medical condition, such as Parkinson's disease. Aspects described herein relate to compensation for motion input from such users as picked up by motion detection devices. As described further herein, a system may detect the presence of rhythmic motion and/or other input characteristics within captured motion input from a user. Rhythmic motion may be an unintended and/or substantially rhythmic or periodic pattern of sufficient temporal duration. For example, if a person attempts to hold out their hand in a steady manner, but their hand trembles or shakes in a substantially oscillatory (e.g. periodic) manner, then their hand may be exhibiting a rhythmic motion which the concepts described herein may suppress and/or eliminate. The oscillations of the rhythmic motions are sometimes the result of opposing muscle groups operating to cause the periodic motion in the person's movement. The system, described herein, may determine one or more filters to apply to the captured motion input based on the rhythmic motion, other input characteristics, and/or information in a user profile. The one or more filters may be applied to the captured motion input in order to suppress or minimize the effects of the rhythmic motion and/or other input characteristics thereby resulting in an enhanced user experience in an interactive system, such as a 3D interactive system or any virtual or augmented reality environment.

In some embodiments a method is provided where a first signal is received by a first computing device. The first signal may comprise user identification information, application data and received motion input captured by one or more sensors. The received motion input may be three dimensional position data based on one or more tracked objects. The first computing device may detect rhythmic motion, such as a user's tremor associated with a body part, e.g., a trembling hand, in the received motion input. The first computing device may determine whether a processing threshold was exceeded (e.g. satisfied). Different types of rhythmic motions may require different amounts of processing in order to successfully eliminate and/or suppress them, and a processing threshold may indicate a boundary between types of rhythmic motion that can be processed locally by the first device, and those that may require additional processing by the same or different local device, or whether a transmission to a remote device for processing is required. If the processing threshold was not exceeded (e.g. not satisfied), then the first computing device may apply a first filter to the received motion input to suppress the rhythmic motion and generate filtered motion input. If the processing threshold was exceeded, then the first computing device may send a request to a second computing device for rhythmic filtering, and the first computing device may receive the filtered motion input from the second computing device based on the request. In generating the filtered motion input, the second computing device may apply a second filter to the received motion input to suppress the rhythmic motion and generate the filtered motion input. The first computing device may transmit a second signal to the application or a motion capture device, based on the filtered motion input indicating that a gesture was detected. This indication is provided to the user to inform them that the application acknowledges and recognizes their motions.

In some embodiments, the one or more sensors may be one or more cameras, such as infra-red cameras, 3D cameras, digital cameras or stereoscopic cameras. The one or more tracked objects may be associated with a user (e.g., may be a user's hand, body, face, facial expressions, or an item articulated by the user). The rhythmic motion may be associated with substantially periodic motion of the user. In other embodiments, the first computing device may detect the presence of rhythmic motion based on a frequency of a pattern in the received motion input exceeding one or more predefined threshold values.

In some embodiments, the first computing device may receive environmental motion input indicating that a user is in a moving environment. The computing device may modify and/or filter the received motion input based on the environmental motion input.

In another embodiment, the first computing device may determine the processing threshold based on a determination that a command associated with the application occurs at a frequency that is higher than the frequency of the pattern in the received motion input. In such a case, increased processing power and/or capabilities may be required to filter out the pattern (e.g. the rhythmic motion) in the received motion input. In some embodiments, the first computing device may apply the first filter by first determining a filter based on the rhythmic motion. The first filter may comprise the filter based on the rhythmic motion. The first computing device may then transmit the filtered motion input or a signal indicating one or more user commands based on the filtered motion input.

In other embodiments, the first computing device may apply the first filter by determining that the application data contains a rhythmic command, retrieving a frequency associated with the rhythmic command, determining a default filter based on the frequency associated with the rhythmic command, wherein the first filter may comprise the default filter, and transmitting the filtered motion input or a signal indicating one or more user commands based on the filtered motion input. For example, some applications may have commands that are rhythmic. In order to avoid suppressing or eliminating those rhythmic commands, the first computing device may determine a default filter that may protect those rhythmic commands while simultaneously filtering out all other rhythmic motions that are not commands.

In still other embodiments, the first computing device may apply the first filter by selecting a stored filter based on the user identification information. The first filter may comprise the stored filter, and the stored filter may be selected from a user profile. The first computing device may determine, after applying the first filter, whether residual rhythmic motion is present in the filtered motion input. If residual rhythmic motion is present then the first computing device may update the stored filter and apply the updated stored filter to the filtered motion input to generate a second filtered motion input. The first computing device may transmit the second filtered motion input and/or a signal indicating one or more user commands based on the second filtered motion input. If the residual rhythmic motion is not present, then the first computing device may reduce strength or an effect of the stored filter based on a predefined value to generate a reduced filter. The reduced filter may be stored in the user profile.

In other embodiments, the one or more tracked objects may be attached to portions of a user's body, such as gloves, shoes or a helmet. The one or more user commands may be commands to manipulate virtual reality objects in virtual three dimensional space.

In some embodiments, the rhythmic filtering comprises accessing, by a computing device, a user profile to determine one or more medical conditions associated with a user. The computing device may determine a stored filter based on the one or more medical conditions and then apply the stored filter to the received motion input to generate the filtered motion input. The computing device may then transmit the filtered motion input or a signal indicating one or more user commands based on the filtered motion input.

In still further embodiments, a method is provided where a signal comprising user identification information and motion input captured by one or more sensors may be received by a first computing device. The received motion input may comprise three dimensional position data associated with one or more tracked objects. The first computing device may detect rhythmic motion in the received motion input and may determine a processing threshold. The first computing device may apply a filter to the received motion input to suppress the rhythmic motion and generate filtered motion input. Applying the filter may be based on a determination that the processing threshold was not exceeded. The first computing device may use the filtered motion input to indicate that a gesture was detected.

In some embodiments, the received motion input may comprise user input bias, such as a tendency to favor a certain direction when making an intended motion or gesture. The first computing device may further determine an intended gesture based on the received motion input, detect the user input bias based on the intended gesture, and remove the user input bias from the received motion input.

In still further embodiments, the first computing device may detect the rhythmic motion by determining the presence of the rhythmic motion based on a frequency of a pattern in the received motion input exceeding a predefined temporal threshold and a predefined frequency threshold.

In other embodiments, the processing threshold may be determined based on access to a user's medical and age information, and/or other physical condition information, and/or a threshold number of users.

In some embodiments, the first computing device may apply the filter by selecting a stored filter based on user identification information and then applying the stored filter to the received motion input to generate the filtered motion input. The first computing device may determine that residual rhythmic motion is present in the filtered motion input. In such case, the stored filter may need to be updated. The first computing device may update the stored filter, and apply the updated stored filter to the filtered motion input to generate a second filtered motion input. In addition, the updated filter may be stored in a user profile. The first computing device may transmit the second filtered motion input or a signal indicating one or more user commands based on the second filtered motion input. In other embodiments, the first computing device may select the stored filter based on the user identification information by accessing the user profile to determine one or more medical conditions and/or an age of a user. The first computing device may determine the stored filter based on the medical condition and the age of the user.

In still further embodiments, a method is provided where a first computing device receives a signal comprising user identification information and motion input captured by one or more sensors. The received motion input may comprise three dimensional position data based on one or more tracked objects. The first computing device may suppress a rhythmic motion by applying a filter to the received motion input to generate filtered motion input. The first computing device may apply the filter based on a determination that a processing threshold was not exceeded. The first computing device may transmit the filtered motion input or a signal indicating one or more user commands based on the filtered motion input.

In a further embodiment, the three dimensional position data may comprise contact pressure, and the processing threshold may be determined based on a frequency and/or another characteristic of the rhythmic motion. For example, the contact pressure may be the result of a user's finger pressing against a touch screen while attempting to swipe in a particular direction. However, because of the user's tremors, the contact pressure may contain unintended rhythmic motion or an unintended pressure pattern. In another embodiment, the first computing device may apply the filter by detecting the presence of rhythmic motion in the three dimensional position data based on a frequency of a pressure pattern exceeding a predetermined threshold. The filter may be determined based on the frequency of the pressure pattern.

In some embodiments, the first computing device may apply the filter by selecting a stored filter based on the user identification information, reducing strength or an effect of the stored filter based on a predefined value to generate a reduced filter, and storing the reduced filter. The filter may comprise the stored filter.

The summary here is not an exhaustive listing of the novel features described herein, and are not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying drawings in which like numerals indicate similar elements.

FIG. 8A illustrates an example of signal waste.

FIG. 8B illustrates an example residual tremor falling within a filter's passband.

DETAILED DESCRIPTION

Figure 1:
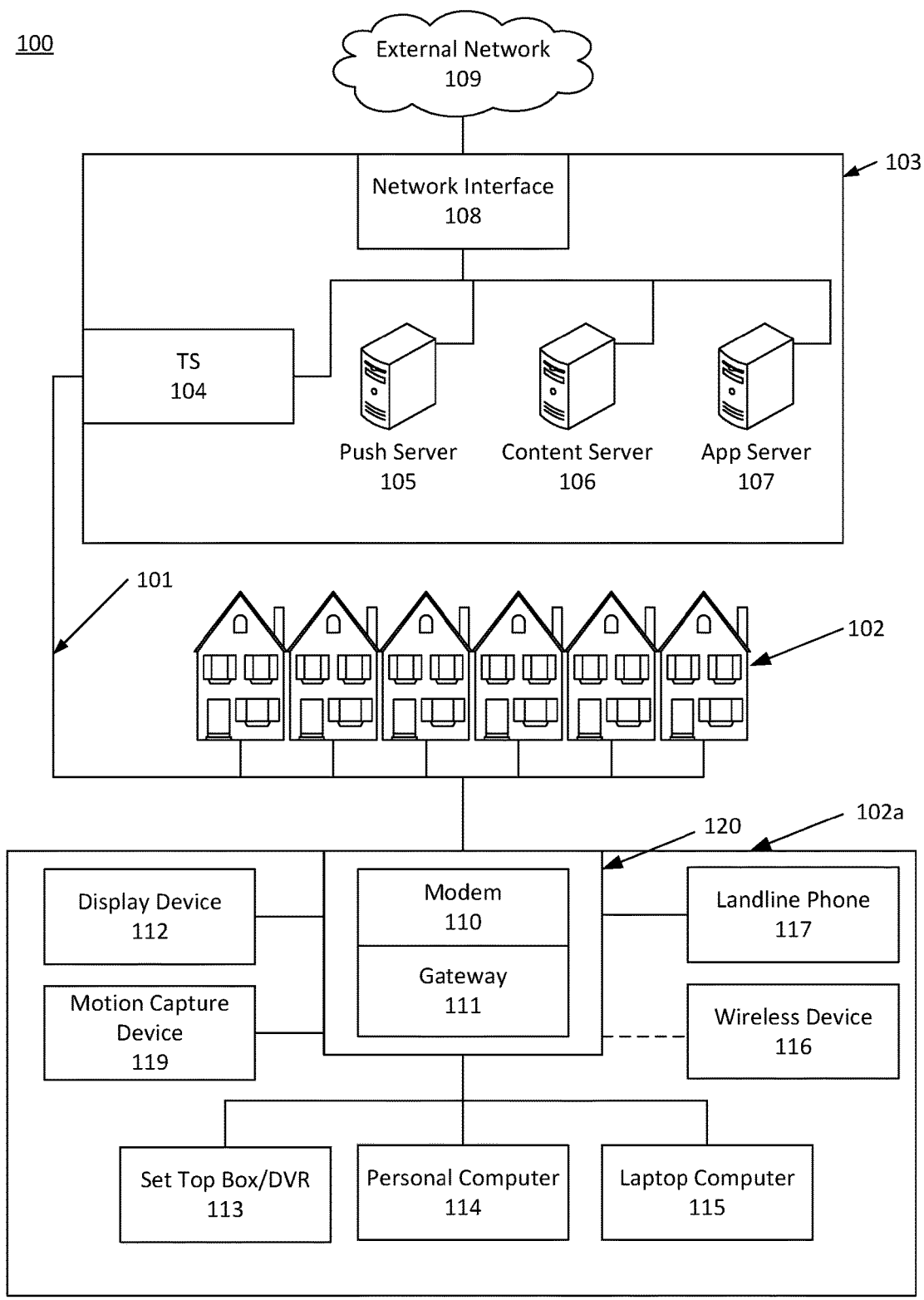
FIG. 1 illustrates an example communication network on which various features described herein may be implemented.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

An illustrative example of a specific application of the techniques disclosed herein may be a user, who has a physical, medical, or other condition (e.g., Parkinson's disease, athletic injury, fatigue, etc.), who wants to use a motion capture device connected to a smart TV in order to run a dance simulation application on the smart TV display. This example is not intended to limit the disclosed techniques described herein. Rather, this example helps illustrate various aspects as will be described below. Upon powering on the smart TV, the first computing device may initialize and reset operational parameters during an initialization phase, and may prepare the sensors associated with the motion capture device connected to the smart TV. The first computing device may then set a processing threshold based on various factors, such as the current processing capabilities and load of the motion capture device. Next, using the sensors of the motion capture device, the first computing device may recognize the identity of the user and determine that a stored filter exists in the user's profile for this particular dance simulation application. The first computing device may determine that the stored filter is a band-stop filter.

Upon start of the dance simulation application, the first computing device may receive 3D user motion input captured by the sensors. The 3D user motion input may report, for example, the position of the user's body parts (arms, legs, head) at various points in time while the user danced along with a song. The first computing device may determine, using frequency processing algorithms, that the received motion input contains a rhythmic motion above a predetermined rhythmic motion threshold, thus an unintended 3D tremor may exist. Given the type of stored filter to be applied, the processing load of the dance simulation application, and/or the processing capabilities of the motion capture device, the first computing device may determine that the processing threshold has been exceeded. The system may then send the 3D user motion input to a remote processing system, e.g. a second computing device, at the service-provider headend 103. The second computing device may apply the stored filter to the received 3D user motion input to suppress the rhythmic motion.

After applying the filter, the second computing device might detect that rhythmic motions still remain. The second computing device may update the filter, using one or more techniques described herein, store the updated filter in the user profile, and then apply the updated filter to the received 3D user motion input. The filtered 3D user motion input may then be transmitted from the second computing device for use by the dance simulation application.

Various features described herein may enable a motion capture or recognition device (e.g. a 3D motion capture device) and/or system to more accurately detect or recognize the intended gestures or movements of a user who experiences or exhibits tremors, e.g. unintended and/or substantially rhythmic or periodic motions of sufficient temporal duration. A first computing device may receive 3D user motion input. In some embodiments, the first computing device may be any one of the devices located in the example premise 102a. In other embodiments, the first computing device may be a combination of two or more of the devices located in example premise 102a. In some embodiments, the user motion input may be 3D positional data. For example, the 3D position data may be a signal comprising a series of data points indicating the position of a moving object through space over a period of time. In other embodiments, the user input may be two dimensional ("2D") positional data plus pressure data. For example, the 2D positional data plus pressure data may be a signal comprising a series of data points indicating the position of a user's finger (or other object, such as a stylus) moving across the surface of a touchscreen plus the pressing pressure of the user's finger on the surface of the touchscreen, e.g. the touchscreen of an interactive computing device like a smartphone, tablet, laptop, smart TV, vehicle navigation display, gaming device, etc. The system analyzes the user motion input to determine the presence of input characteristics, such as rhythmic motion, which might not be an intended part of a user's gesture or input.

For example, if the user has a trembling hand while making an input gesture (e.g., raising a hand to make a fist), then the tremble of the hand may be detected along with the actual intended gesture. If the system detects the presence of this rhythmic motion (e.g. trembling), it might decide to process the data to filter the rhythmic motion from the user input before it is sent along for gesture detection, or if the filtering would require too much processing (e.g. required filtering exceeds local processing capacity), the first computing device may send the motion input to a remote processor, e.g. a second computing device, with greater processing capabilities. In some embodiments, the processing responsibilities may be divided between the remote and local processors. During processing, the system might determine a filter to apply in order to suppress the rhythmic motion. In some embodiments, the filter is determined based on rhythmic commands associated with one or more applications. In other embodiments, the system may apply a filter that is stored in a user profile. The system may handle several user profiles and multiple users. In still other embodiments, the system might update the user profile data and/or update the stored filter if tremors still remain after the filter is applied or if a comparison of the filter and the actual user rhythmic motion shows that the rhythmic motion falls within the filter's pass band. In some embodiments, the filter may be created based on the detected rhythmic motion. In other embodiments, the filter might be determined based on user medical data and/or age. In other embodiments, a user motion bias may be corrected. After the filter is applied, the system may transmit the filtered 3D user motion input and/or the system may determine user commands associated with the filtered 3D user input to be used by the one or more applications.

Figure 2:
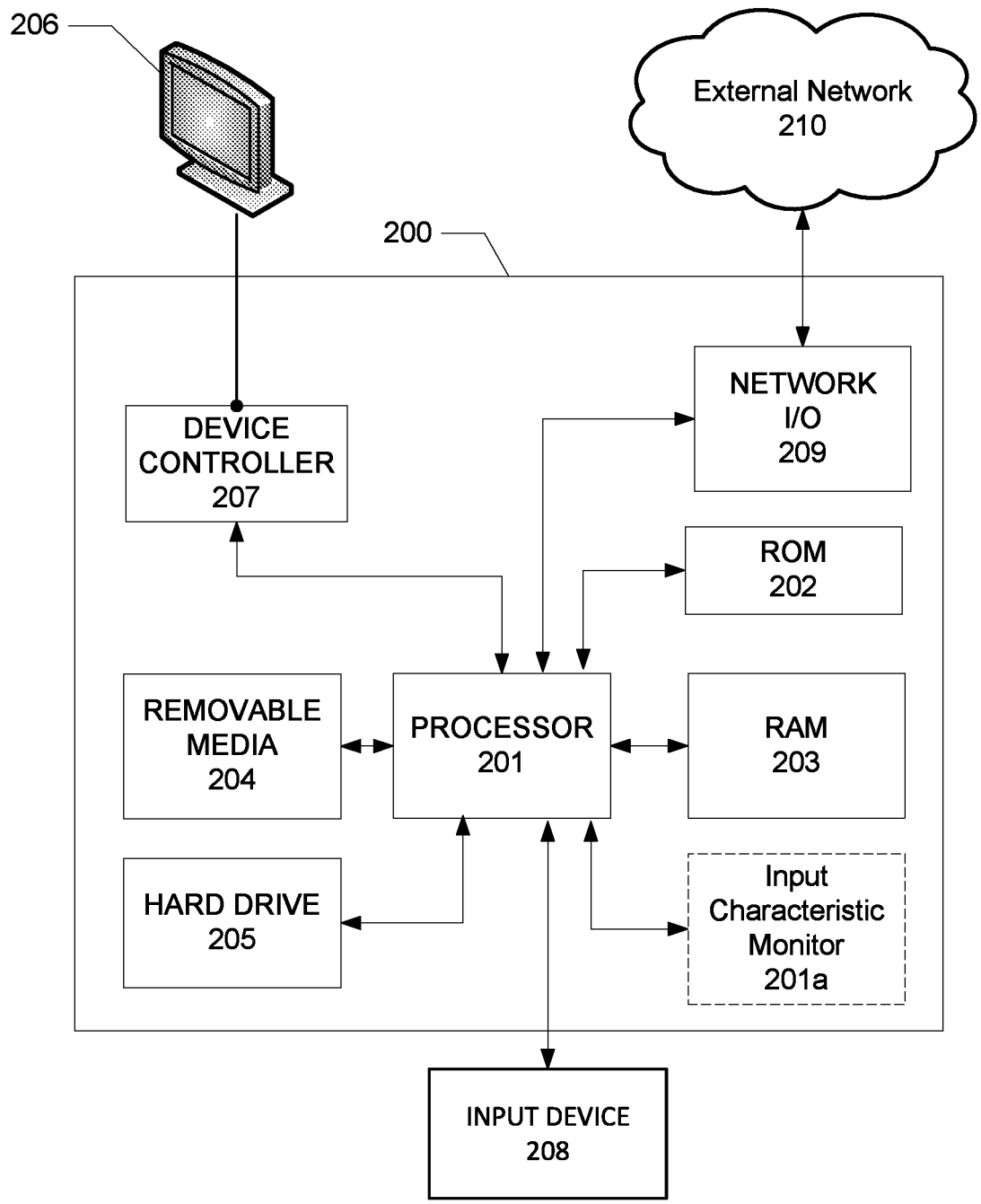
FIG. 2 illustrates an example computing device that can be used to implement any of the features described herein.
Figure 3:
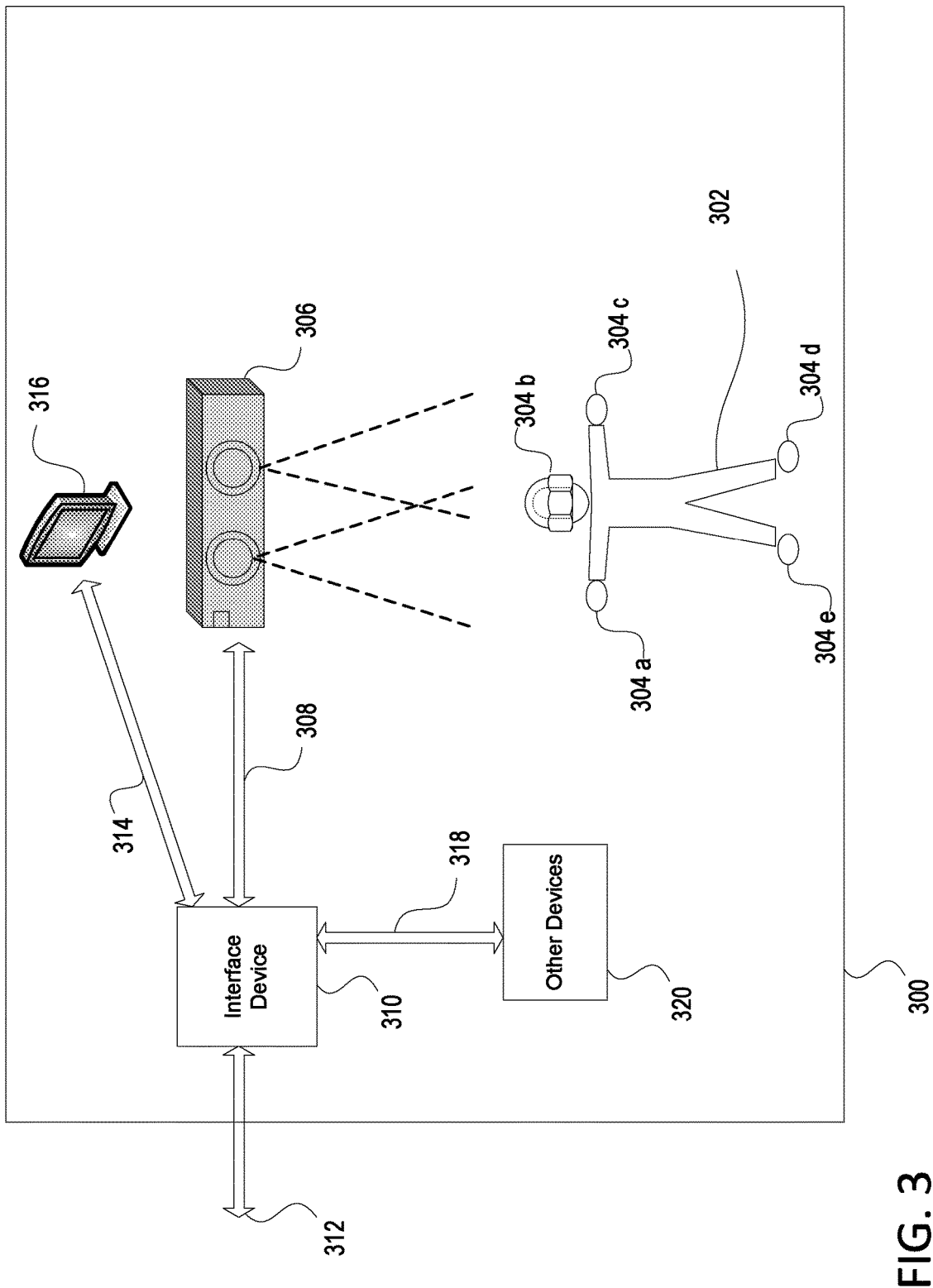
FIG. 3 illustrates an example operating environment in which one or more of the various features described herein may be implemented.

Various features of methods, systems and apparatus for improving the accuracy of user input detection (e.g. 3D user input motion detection), while optimizing processing resources of associated motion capture or recognition systems (e.g. 3D motion capture devices), will be described in greater detail below. However, first an exemplary operating environment as shown in FIGS. 1, 2 and 3 will be described.

FIG. 1 illustrates an example communication network 100 on which many of the various features described herein may be implemented. The network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths. By running fiber optic cable along some portions, for example, signal degradation may be significantly minimized, allowing a single local office 103 to reach even farther with its network of links 101 than before.

The local office 103 may include an interface 104, such as a termination system (TS). More specifically, the interface 104 may be a cable modem termination system (CMTS), which may be one or more computing devices configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be one or more computing devices configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Still, another application server may be responsible for receiving and transmitting communications related to a security system in accordance with the present disclosure. Each of the described functions may be provided by one or more application servers, and a single application server may provide more than one of the described functions. For example, a single physical server may implement one or more application servers responsible for each of the described functions. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data, which may include security system access information, restrictions, and access logs as a result of performing steps described herein.

An example premise 102*a*, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include an interface device 111, such as a gateway. The modem 110 may be connected to, or be a part of, the interface device 111. The interface device 111 may be one or more computing devices that communicate with the modem (s) 110 to allow one or more other devices in the premises 102a, to communicate with the local office 103 and other devices beyond the local office 103. The interface device 111 may be a set-top box (STB), digital video recorder (DVR), computer server, or any other desired computing device. The interface device 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), motion capture device 119 (e.g. a 3D motion capture device), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Having described an example communication network shown in FIG. 1 in which various features described herein may be implemented, an example computing device as shown in FIG. 2 will be described.

FIG. 2 illustrates general hardware elements that can be used to implement any of the various computing devices discussed herein, such as a first computing device and/or a second computing device. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television or monitor, or an integrated display), and may include one or more output device controllers 207, such as a video processor. There may also be one or more user input devices 208, such as a remote control, keyboard, mouse, touch screen, microphone, camera for capturing images and/or video, and the like. One or more input devices 208 may be integrated within the computing device 200. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include an input characteristic monitor 201a which may enable the device to perform the steps described herein.

The FIG. 2 example is a hardware configuration, although the illustrated components may be wholly or partially implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Having discussed an example network environment and computing device, discussion will now turn to FIG. 3, which illustrates an example operating environment in which various features described herein may be performed and implemented.

As illustrated in FIG. 3, the environment may include a premise 300 (which may correspond to the example premise 102a of FIG. 1), such as a user residence, business, recreational facility, etc. (referred to herein as a user residence, home, or premises in a non-limiting manner). The environment may include a motion capture device 306, such as a stereoscopic camera with associated image processing capabilities (which may correspond to the motion capture device 119 of FIG. 1), which may observe a user 302. The user 302 may be associated with one or more tracked objects 304a-e, which the motion capture device 306 may track in order to receive 3D user motion input. In some embodiments, the one or more tracked objects may be parts of the user's anatomy, such as their hands, feet, or head. In other embodiments, the one or more tracked objects may be items of the user's attire, such as shoes or a hat. In still other embodiments, the one or more tracked objects may be specialized attire, such as gloves, shoes and/or a helmet that contain sensors to allow the motion capture device 306 to more accurately track the user's motions. In further embodiments, the one or more tracked objects may be devices, such as a wand and/or controller that are held, wielded and/or articulated by the user.

As discussed earlier, based on criteria described in further detail herein, the received 3D user motion input (which may contain rhythmic motion) may be processed by a local first computing device and/or a remote second computing device. Further, the local first computing device may be any one or more of the devices within the residence 300. In some embodiments, the first computing device may be the motion capture device 306. In that case, the received 3D user motion input may be processed by the motion capture device, using one or more of the various tremor suppression and/or elimination methods described further herein, to create a filtered 3D user motion input and/or commands used by the application being run by the first computing device. The filtered 3D user motion input and/or commands may travel through pathway 308 to be received by the interface device 310 (which may correspond to the user interface 120 of FIG. 1) which may send the transmission to the display 316 (which may correspond to the display device 112 of FIG. 1) via pathway 314. The pathways may be any medium used to carry a signal, such as physical cables and fiber optics or any wireless technology.

In other embodiments, the first computing device may be the interface device 310, which may receive the 3D user motion input via pathway 308 from the motion capture device 306. The interface device 310 may process the input, using one or more of the various methods described further herein, to generate a signal comprising filtered 3D user motion input and/or commands used by the application being run by the first computing device. The interface device 310 may transmit the signal to display 316 via pathway 314 for consumption by user 302.

In some embodiments, the first computing device may be one or more of other devices 320 (which may correspond to one or more of 113-116 of FIG. 1) in the residence 300. In such cases, the interface device 310 may receive the 3D user motion input from the motion capture device 306 via pathway 308. Then the one or more premises devices 320 may receive the 3D user motion input via pathway 318 from the interface device 310. The one or more premises devices 320 may then process the input, using one or more of the various methods described further herein, to generate a signal comprising filtered 3D user motion input and/or commands used by the application being run by the first computing device. The interface device 310 may receive the signal via pathway 318 and transmit the signal across pathway 314 to display 316 for consumption by user 302.

In still further embodiments, the first computing device may be the display 316. In such case, the user motion capture device transmits the received 3D user motion input across pathway 308 to the interface device 310, which then forwards the transmission via pathway 314 to the display 316. Display 316 may then processes the transmission using one or more of the methods described further herein in order to generate filtered 3D user motion input and/or commands used by the application being run by first computing device. The application may then display corresponding signals on display 316 for consumption by the user 302.

In other embodiments, any one or more of the first computing devices described above may determine, based on criteria described further herein, that the received 3D user motion input should be processed by a remote second computing device with greater processing capabilities. This second computing device may be, for example, the app server 107 of FIG. 1, located at the service provider headend 103 of FIG. 1. In such a case the first computing device may transmit the received 3D user motion input across pathway 312 to the second processing device. Then, the second processing device may process the input, using one or more of the various methods described further herein, to generate a signal comprising filtered 3D user motion input and/or commands used by the application being run by either the first or second computing devices. If the first computing device is running the application, then the signal is sent to the first computing device across pathway 308 for final processing by the application running on the first computing device. If the second computing device is running the application, then a corresponding application signal is sent across pathway 312 to interface 310 and then across pathway 314 to display 316 for consumption by user 302.

In further embodiments, one or more of the other devices 320 may contain a motion capture device (e.g. a 3D motion capture device) which observes the user 302 in order to capture the 3D user motion input. In such cases, the environment described above for FIG. 3 may be adjusted accordingly.

Figure 6:
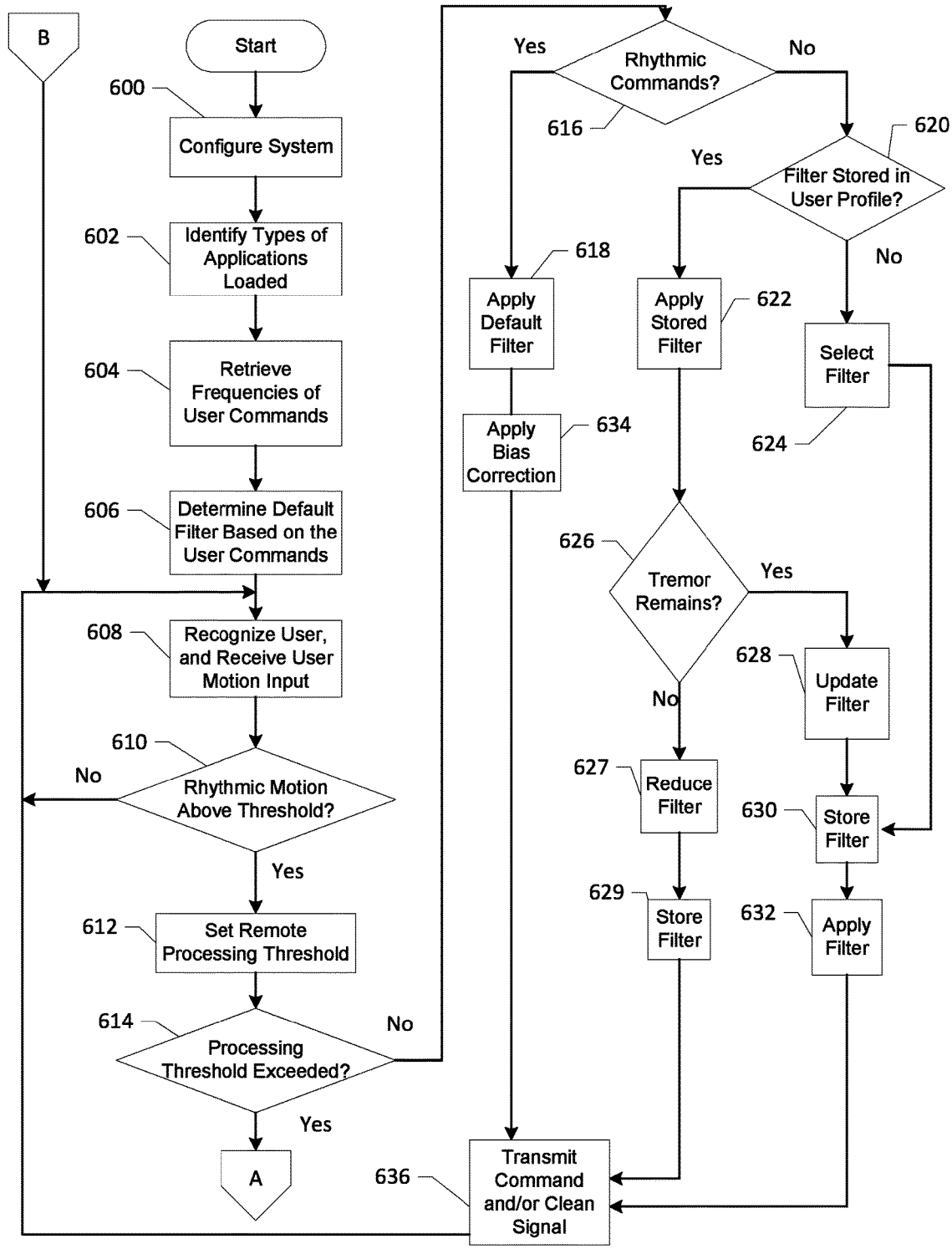
FIG. 6 illustrates an example method for implementing various features described herein.
Figure 7:
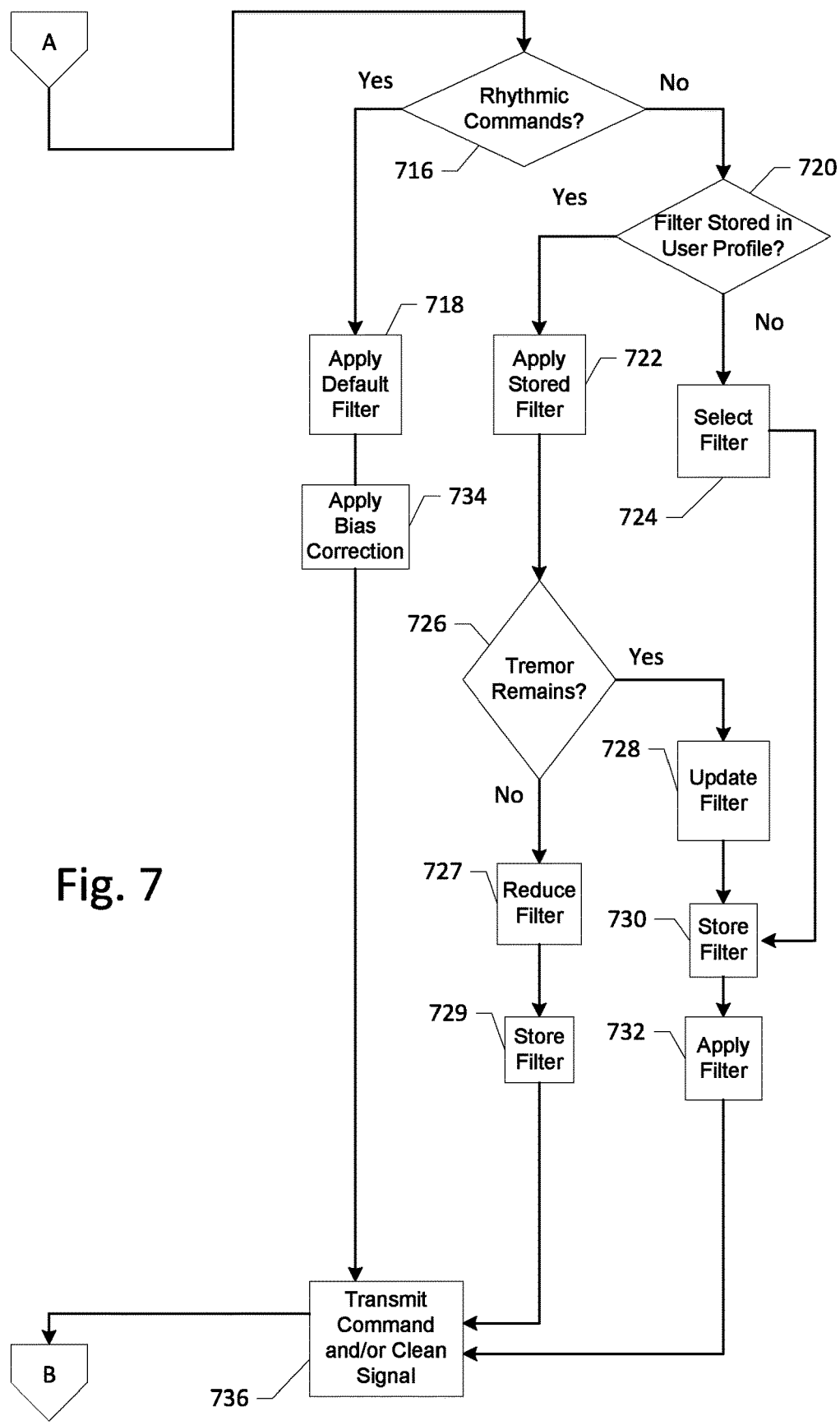
FIG. 7 illustrates another example method for implementing various features described herein.

Having discussed an example network environment, an example computing device, and an example operating environment, discussion will now turn to a method, apparatus and/or system according to one or more embodiments as illustrated in FIG. 6 and FIG. 7.

FIG. 6 illustrates an example method, apparatus or system of rhythmic motion suppression and/or elimination that can be performed by any computing device 200 connected to the communications network 100 of FIG. 1. For example, the motion capture device 119 (e.g. 3D motion capture device), wireless device 116, laptop computer 115, personal computer 114, set top box/DVR 113, or app server 107 may perform some or all of the described steps. In some embodiments, a user, who exhibits tremors due to a medical condition such as Parkinson's, may power-on a motion capture device 119 and connect to the systems depicted in FIGS. 1, 2 and 3. The sensors of the system may be one or more cameras (such as a stereoscopic camera or infrared cameras), light sensors or any other devices capable of detecting and tracking objects in order to capture 3D motion. The techniques described below for FIG. 6 may be performed by a first computing device, but for ease of description, the first computing device will be referred to as simply "the computing device."

In step 600, the computing device may initiate a configuration phase to set and/or reset the operational variables for the computing device and/or the 3D motion based application being run on the computing device. The variables to be set and/or reset may comprise variables representing 3D position data associated with a user, 2D position data plus pressure for a touchscreen, any thresholds values herein, and/or any of the filters described herein.

In step 602, the computing device may identify the one or more types of applications to be run. For example, the computing device 200 may run a 3D gesture based smart TV control application, a dance simulator application, a football simulator application, a finger painting simulator application, or any application that may use 3D gesture or 3D motion as input. Knowing the types of application that are being executed may assist the system in anticipating the types of user gesture input to expect and/or the types of commands that may be associated with the applications.

In step 604, the computing device may determine whether the one or more applications are associated with (e.g. contain or use) gesture commands that may be based on rhythmic gestures or patterns. For example, certain hand gestures may correspond to gesture commands used by an application. In a 3D gesture based smart TV control application, a simple (non-rhythmic) hand gesture that starts from a pause and then swipes to the right may correspond to a command to scroll through a list of possible movie selections. Thus, a hand swipe motion may be a gesture command used or associated with the smart TV control application. As another example, in a children's finger painting application, a rhythmic hand wave (e.g. a hand oscillating from side to side) may correspond to a command to erase a drawing on the smart TV display. Thus, a hand wave gesture may be a rhythmic gesture command used or associated with the finger painting application. The computing device might identify any gesture commands that contain rhythmic features or are based on rhythmic motion, and then use frequency analysis algorithms or a look up table to retrieve the frequencies of those rhythmic gesture commands. By determining what gesture commands actually include rhythmic motions, the system can calibrate itself (see step below) to ensure that it does not accidentally filter out the rhythmic motion that actually corresponds to a gesture command used by the application.

Figure 5A:
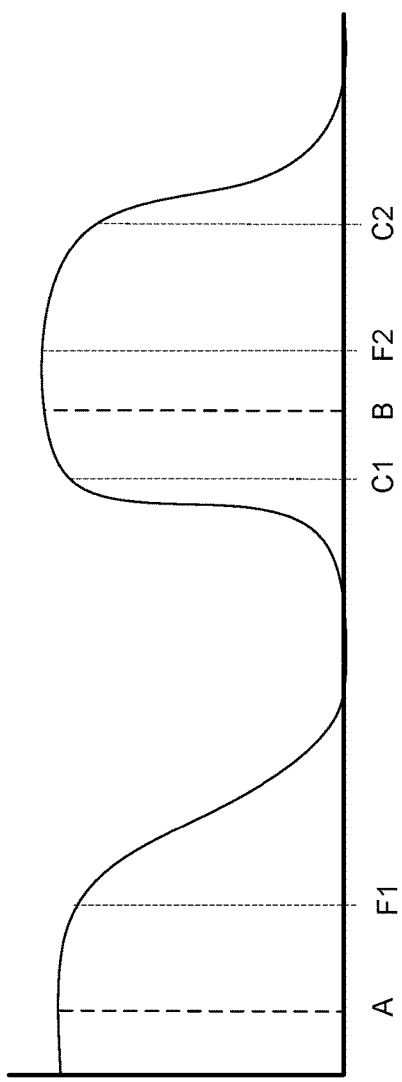
FIG. 5A illustrates an example default filter.

In step 606, the computing device may determine a default filter based, in part, on the retrieved frequencies of any rhythmic gesture commands (used by an application) identified in the previous step. In general, human motion is not perfectly steady. As such, human motion may naturally contain rhythmic features occurring at lower frequencies. As an initial step, the computing device may determine that any rhythmic user motion that occurs below a predetermined frequency "A" (e.g., in Hz) will be treated as normal human motion that should not be eliminated and/or suppressed. In other words, any rhythmic user motion below a predetermined frequency "A" will be treated as non-rhythmic motion and/or may be referred to as "normal motion." Next, the computing device may determine a filter designed to permit the frequencies of the "rhythmic gesture commands (identified in Step 604)" and/or also the "normal motion" to pass without suppression. As an illustration, using the children's finger painting application example, the computing device may identify that a rhythmic hand wave gesture (e.g. a hand oscillating from side to side) occurs within a frequency range "B" (in Hz) and corresponds to a gesture command to erase a drawing on a TV display. In this example, the system may determine a default filter comprising a low pass feature to permit the transmission of normal hand gestures occurring at or below frequency "A" and a band pass feature to permit the transmission of the rhythmic hand wave gesture command at frequency range "B." As a result, if the computing device later decides to apply the default filter, then the filter may suppress and/or eliminate some tremors while not affecting the intended rhythmic gesture command signal and/or the normal motion. In this way, a default filter may be created to protect expected rhythmic gesture commands (identified in Step 604) and/or normal motions. FIG. 5A illustrates the example default filter described above with a cutoff frequency F1 for the low pass feature and a center frequency of F2 for the band pass feature which has its own lower cutoff frequency "C1" and upper cutoff frequency "C2" to represent the frequency range of "B." Step 606 is an optional step that may be disabled or simply not used.

In step 608, the computing device may recognize the identity of the user via one of several methods, such as facial recognition, voice recognition and/or recognizing a user input, e.g. a user code or icon selection. Determining the identity of the user is optional and is not required to carry out the concepts described herein. The computing device may also receive 3D user motion input, which may report on the position of the user's body, body parts and/or detected objects associated with the user at various points in time throughout a detection period. The computing device may use one or more sensors attached to, embedded in, and/or communicating with the motion capture device to observe the user and capture their 3D user motion data. The sensors may capture the data by observing one or more tracked objects. The one or more tracked objects may be associated with the user. For example, the one or more tracked objects may be items worn by or attached to the user, such as gloves, shoes and/or a helmet. In other embodiments, the tracked objects may be the user's body or parts of the user's body, such as fingers, hands, feet, head, legs, and the like. In some embodiments, the tracked objects may be items or devices held and/or articulated by the user, such as a wand or a controller. In still other embodiments, the tracked objects may be associated with a touchscreen device, e.g. a user's finger/stylus pressing on and/or moving across the surface of a touchscreen for an interactive device, such as smartphone, tablet, laptop, smart TV, vehicle navigation display, gaming device, etc.

In step 610, the computing device may use frequency analysis algorithms to detect the presence of rhythmic motion in the received 3D user motion. To accomplish this, the system may conduct frequency domain analysis in each of the x, y and z positional components of the received 3D user motion input in order to detect the presence of rhythmic motion in one or more of the positional components. In some embodiments, the frequency domain analysis involves Fourier and/or Fast Fourier transform analysis. Rhythmic motion may be an unintended and/or substantially rhythmic or periodic pattern of sufficient temporal duration. The computing device may be configured to identify a motion or pattern as rhythmic only if a predetermined frequency threshold is exceeded and/or a predetermined time duration threshold is exceeded for a particular 3D motion. In some embodiments, both the predetermined frequency threshold and the predetermined time duration threshold form a rhythmic motion threshold.

The rhythmic motion threshold may be necessary to ensure that the techniques described herein do not suppress intended or normal rhythmic motions of the user. For example, some user motions may have natural rhythmic qualities that occur at very low frequencies. As such, the predetermined frequency threshold may be set at an appropriate level to ensure that those motions are identified by the computing device as unintended rhythmic motions and/or rhythmic motions that should be removed.

In setting the predetermined time duration threshold, the computing device may consider several factors. First, the computing device may set the threshold at a level considered to be the outer time boundary of a normal rhythmic gesture of a child or an adult. In the alternative, if the application being run contains rhythmic commands, then the computing device may retrieve any time durations associated with those commands. (For example, in the finger painting application, the rhythmic hand-wave command may be set to occur for only a specific duration in seconds.) The computing device may set the predetermined time duration threshold to align with the time duration associated with the rhythmic command that has the longest time duration. This time duration threshold may be established during the configuration phase at step 600.

For example, in some embodiments, the predetermined frequency threshold might be set to 2 Hz, and the predetermined time duration threshold might be set to 2 seconds. If the system detects a rhythmic motion (in the received 3D user motion input) that occurs at a frequency above 2 Hz and that also lasts uninterrupted for more than a 2 second duration, then both predetermined thresholds may have been exceeded. In that case, the rhythmic motion threshold may have been exceeded. In this example, the system may send the received 3D user motion input to be processed by one of the filtering steps described further herein. If the system fails to detect a rhythmic motion that exceeds the rhythmic motion threshold, then the system returns to step 608 as part of a continuous loop. The use of 2 Hz for the predetermined frequency threshold, and 2 seconds for the predetermined time duration threshold were purely for illustration and are not meant to be limiting. In some embodiments the predetermined frequency threshold may be more or less than 2 Hz and the predetermined time duration threshold may be more or less than 2 seconds.

In further embodiments, the z positional component of the received 3D user motion input may comprise pressure data based on contact pressure. In some embodiments, the pressure data might be associated with a touchscreen device that may be connected or monitored by the motion capture device. For example, the x and y positional components may represent motion across the surface of a touchscreen, and the z positional component may represent contact pressure motion on a touchscreen. The frequency domain processing techniques described earlier for step 610 may apply to the analysis of the received 3D user motion, where the z positional component is pressure data, e.g. where the received 3D user motion comprises 2D position information and pressure data. In this case, frequency domain or frequency response analysis may be conducted on the contact pressure data to determine the presence of rhythmic motion. Regarding contact pressure, the predefined frequency threshold value and/or the predefined time duration threshold value may be different than those described earlier.

In some embodiments, the computing device may have the option to process and filter the received 3D user motion data locally (for example at one or more of the motion capture device 119 or 306, set top box 113, or the like) or remotely (for example at the service provider headend 103). Remote processing at a second computing device may be preferred due to possible limited processing capabilities of the local devices, especially if processing requirements begin to match or exceed local capabilities, thus having a negative effect on a user experience. At step 612, the computing device may use several factors to determine a processing threshold, whereby if this threshold is met and/or exceeded, then the received 3D user motion input data may be transmitted elsewhere for additional processing, such as to another local or a remotely located computing device for further processing.

At step 612, there are several factors that the computing device may consider either individually or in combination when determining the processing threshold, such as:

a. processing limits of local devices or application,
b. type of default filter,
c. type of filter stored in the user profile,
d. other processing tasks required of the motion capture device,
e. number of users,
f. processing limits of the local device, such as memory and processing speed,
g. processing demands of the application(s) being run,
h. time domain and/or frequency domain amplitude of the 3D received user input motion,
i. type of filter stored in a user profile,
j. frequency of the rhythmic motion,
k. whether user medical and age data is available to the system, and/or
l. whether a rhythmic command occurs at a frequency that is higher than the frequency of the 3D rhythmic motion, thus necessitating higher level filtering.

For example, in some embodiments, the processing threshold may be set based on whether particular applications possess processing requirements that meet or exceed the processing capabilities of the computing device. In still other embodiments, the processing threshold may be set based on particular types of filters. For example, the threshold may be set to a low pass filter of a particular cutoff frequency. Thus, if the computing device determines that a default filter or a stored filter is a band pass and/or band stop filter, then the processing threshold may be deemed exceeded because the filter may demand an unacceptable amount of processing resources and/or the computing device may not be configured to apply that type of filter. For example, the motion capture device might only be able to process a low pass filter and/or might only be configured to process a low pass filter. However, the default filter may be a combination low pass and band pass filter, such as the one illustrated in FIG. 5A. In such an example, the processing capabilities of the computing device may be exceeded or unacceptably burdened; therefore, remote processing by a second computing device (and/or additional and/or supplementary processing by a second local computing device) may be needed. In some embodiments, the processing threshold may be based on a maximum number of users combined with a type of application being run by the computing device. In other embodiments, the computing device may determine the processing threshold based on criteria set in a database, wherein the database comprises criteria based on the factors listed in the previous paragraph, both individually and in combination.

In still other embodiments, the computing device may determine the processing threshold based on a situation where the frequency of an expected rhythmic command, associated with an application being run by the system, may be higher than the frequency of the rhythmic motion detected in the received 3D user motion input. In this case, the computing device may determine that remote processing by a second computing device is appropriate. In further embodiments, the computing device may determine the processing threshold based on a need for a complex filter that may exceed the processing capabilities of the computing device. For example, the computing device may determine that any filter higher than a first order low pass filter might exceed the processing threshold, or in another embodiment, the computing device may determine that any filter more complex than a third order low pass filter may exceed the processing threshold. As a further example, the processing threshold may be set such that the use of any default filter or stored filter that is more complex than a first order low pass filter may automatically exceed the threshold. The above examples are simply illustrative and are not intended to be exhaustive or limiting.

The processing threshold of step 612 may be set to account for any of the above situations, individual factors or combinations thereof to ensure that the processing capabilities of the computing device are not overburdened, thus guaranteeing optimal processing speed and an enjoyable user experience. Any of the computing devices, discussed herein, may be deemed overburdened (e.g. exceeding processing capabilities) if, for example, a percentage and/or level of its processing capacity, RAM and/or other memory storage capacity has been reached, exceeded and/or satisfied. This percentage and/or level may be variable and/or may be preset and may be used in determining the processing threshold. In addition, the processing threshold may be multi-level or may consist of multiple parts. In some embodiments, the computing device (e.g. the first computing device) may perform a quick check to determine how much processing power (e.g. processing resources, such as memory, time, processing speed and capacity of component parts, etc.) is available and/or needed to process an application. In some embodiments, the quick check may comprise one or more of the example factors discussed previously. This check may be used to assist in automatically and/or manually setting or updating the percentage and/or the processing threshold.

For example, upon receiving an indication that a finger painting application has been selected, the computing device may perform a quick check and may determine that 70 percent of its processing power is currently being used by and/or committed to other functions. As a result, the computing device may automatically set the processing threshold at 30 percent of its processing power. The quick check may also reveal that the finger painting application would require 50 percent of the computing device's processing power. In this example, the computing device may determine that the processing threshold has been exceeded.

In another embodiment, the computing device may be the motion capture device, which may have a multiple-part processing threshold (e.g. the threshold may have two or more parts). The first part may be similar to the 30 percent threshold described in the previous example. The second part may be a preset processing threshold that is set to a specific filter. For example, the second part may be set to a low pass filter with a 4 Hz cutoff frequency. If the computing device determines that the finger painting application only requires 10 percent processing power (of the computing device), but there exists a rhythmic motion at 8 Hz as received by the motion capture device, then the computing device may determine that the first part was not exceeded, but the second part has been exceeded (or satisfied). As a result, in this example, the computing device may determine that the overall processing threshold has been exceeded, and it may send the received 3D user motion input to another local computing device or to a remote computing device for further processing.

In step 614, the computing device may determine, based on the factors and/or combination of factors illustrated above, that the processing threshold was not met and/or not exceeded. In that case the received 3D user motion input may be processed locally by the computing device.

In step 616, the computing device may determine that the application being run has rhythmic commands for which a default filter was determined (see optional step 606). In step 618, the computing device may apply the default filter to the received 3D user motion input. The filter may suppress and/or eliminate the detected rhythmic motion thus generating a filtered 3D user motion input.

Figure 4A:
FIG. 4A illustrates an example intended user gesture.
Figure 4B:
FIG. 4B illustrates an example actual user gesture.
Figure 4C:
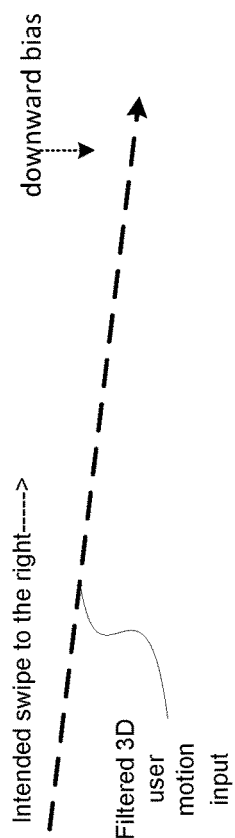
FIG. 4C illustrates an example filtered user gesture.

In step 634, the computing device may apply a bias correction to the filtered 3D user motion input, based on a user bias (e.g. an input user bias). User bias may be a tendency for a user to favor a particular direction when executing a physical gesture. For example, let's say a user wants to move their hand horizontally from left to right, as illustrated by FIG. 4A, but their actual motion goes right and unintentionally downward, as illustrated by FIG. 4C. The unintentional downward movement may be an unintended user bias (e.g. an input user bias). Thus, in this example, when the user motions their hand from left to right, they may manifest a user bias that favors a downward direction. The computing device may access a user database and/or user profile, based on (for example) the optional user recognition discussion at step 608, to determine whether a user bias value is stored for the general type of motion exhibited by the filtered 3D user motion input. If a user bias value is stored in the user profile for this general type of motion, then the computing device may apply the user bias value to the filtered 3D user motion input in order to create a refined 3D user motion input.

The computing system may categorize motions into general types, such as horizontal, vertical, depth and/or other appropriate types of motions. Further, the user database may store user bias values based on these general types. Each general type of motion may have different user bias values. As an example, a user "A" may have a user profile which comprises user bias values for some general types of motions. For example, the user profile may indicate that for a general rightward horizontal motion, user "A" may exhibit a downward bias of a specific value, range of values, and/or average value. In other words, when user "A" intends to motion their hand to the right, they may exhibit some unintentional downward motion, as illustrated by FIGS. 4A and 4C. User "A" may exhibit user bias within other general motions as well, such as pushing away, pulling back, gesturing up, gesturing down, and/or moving to the left, etc. A user profile may contain user bias values respectively for each of these general types of motions.

However, if a user bias value is not stored in the user database and/or user profile, then the computing device may: (1) further process the filtered 3D user motion in accordance with step 636, and (2) also determine a user bias value to be used for the next iteration of this algorithm. To determine the user bias, the computing device may first determine the general type of motion exhibited by the filtered 3D user motion input. This may be done by comparing the x, y and z components of the filtered 3D user motion input to determine which component experiences the greatest change of position values. For example, if the x component experiences the greatest change in position values, then the general type of motion may be categorized as a horizontal type of motion, for example right-horizontal or left-horizontal. If the y component experiences the greatest change in position values, then the general type of motion may be categorized as a vertical type of motion. And if the z component experiences the greatest change in position values, then the general type of motion may be categorized as a depth type of motion.

Once the type of motion is determined for the filtered 3D user motion input, then the computing device may compare the filtered 3D user motion input to a database of recognized 3D user gestures. Each of the recognized 3D user gestures in the database may correspond to commands of the application being run. The computing device may correlate the filtered 3D user motion input to one or more of the recognized 3D user gestures of the database in order to obtain correlation values. The recognized 3D user gesture with the highest correlation value may be deemed a match with the filtered 3D user motion input. Next, the computing device may marry the center point or starting location of the filtered 3D user motion input to the center point or starting location of the matched gesture. Then the computing device may measure the angular difference (angle-theta) between the filtered 3D user motion input and the matched gesture. This angle-theta may be stored in the user profile as the user bias value for that general type of motion (e.g. horizontal, vertical or depth motion) to be used during the next iteration of the algorithm, e.g. to be used when the next 3D user motion input is received.

Figure 4D:
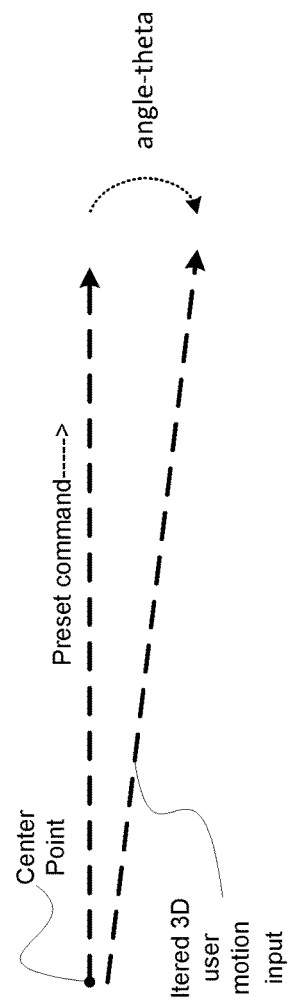
FIG. 4D illustrates an example determination of user bias.

For example, in a 3D controller application for a smart TV, a user may use his hand to start from a center point and then swipe to the right. The user's intended gesture may be depicted by FIG. 4A. The user may have intended this 3D gesture to correspond to a command to scroll movie selections to the right. Because of the user's tremors, the actual gesture may contain a rhythmic motion, resulting in the motion depicted in FIG. 4B. After the filtering steps described earlier, the rhythmic motion may have been successfully removed resulting in filtered 3D user motion input. However, a user bias may still exist as depicted in FIG. 4C (for a right-horizontal type motion, the user may tend to always favor a downward bias). In order to capture this user bias, the computing device may first determine the general type of motion exhibited by the filtered 3D user motion input of FIG. 4C. The computing device may calculate that the greatest change in values was experienced in the x component of the received 3D user motion input and/or the filtered 3D user motion input. As a result, this motion may be categorized as, for example, right-horizontal. Next, the computing device may compare the matched gesture to the filtered 3D user motion to determine angle-theta, as depicted in FIG. 4D. For this example, it is important to note that the matched gesture also corresponds to the user's intended gesture of FIG. 4A. As a result, angle-theta may be the user bias that is stored in the user profile for right-horizontal motions. As described earlier, this user bias may be used during the next iteration of this algorithm, e.g. when the next 3D user motion input is received. In other embodiment, the user bias (e.g. input user bias) may be immediately applied to the filtered 3D user motion input to further improve the accuracy of the motion capture device.

Step 634 (Applying Bias Correction) is an optional step that is not required to carry-out the filtering steps herein. Also, step 634 may be performed in conjunction with any of the filtering steps disclosed herein and/or at any time before the filtered motion input is transmitted and/or processed by step 636. Also, step 634 may be performed with step 636. For example, step 634 may be performed after step 629 and/or after step 632 and/or any time prior to or in conjunction with step 636.

In step 636, the computing device may determine the type of input required by the application being run. In other words, the computing device may determine whether the application requires 3D user motion input, actual command inputs determined from the 3D user motion input, or both. If the application requires command inputs, then the system may access the database of recognized 3D user gestures to compare either the "refined 3D user motion input" or the "filtered 3D user motion input" to the recognized 3D user gestures. As described earlier, each of the recognized 3D user gestures in the database may correspond to one or more commands of the application being run. The computing device may correlate the filtered 3D user motion input to one or more of the recognized 3D user gestures of the database in order to obtain correlation values. The recognized 3D user gesture with the highest correlation value may be deemed a match with the filtered 3D user motion input. As a result, the one or more commands associated with the matched recognized 3D user gesture may be transmitted to the application.

In another embodiment, the application may only require 3D user motion input, and not command inputs. The computing device may then transmit the filtered 3D user motion input or the refined 3D user motion input to the application. In some embodiments, the application may require both the commands and the filtered 3D user motion input or the refined 3D user motion input. In such case, the computing device may transmit both to the application. Both may be transmitted in the same signal and/or in separate signals. Also, both may be transmitted substantially simultaneously, e.g. one may be transmitted either slightly ahead or slightly behind the other. Also, both may simply be transmitted simultaneously. Then the system may return to step 608 to begin the process again.

Returning to step 616, the computing device may recognize that the application being run may not use rhythmic commands (see optional step 606) and/or step 606 has been disabled and/or is not in use.

In step 620, the computing device may determine that a stored filter exists for the user in a user profile. The determination that a stored filter is associated with a user profile may be based on the system successfully recognizing the identity of the user. The identity of the user may be obtained in several ways, for example, by way of the optional discussion in step 608.

In step 622, the computing device may apply the stored filter to the received 3D user motion input in order to suppress the rhythmic motion identified in step 610 and to generate filtered 3D user motion input.

In step 626, after applying the stored filter, the computing device may use frequency analysis techniques to determine if residual rhythmic motions are still present, e.g. to detect any remaining rhythmic motions. This situation may arise if the frequency response of the user's tremor changes in such a way as to bring it within the pass band of the stored filter.

To determine if residual rhythmic motions are still present after applying the stored filter, the computing device may conduct frequency domain analysis in each of the x, y and z positional components of the filtered 3D user motion input in order to determine if rhythmic motions are still present in one or more of the positional components. In some embodiments, the frequency domain analysis involves Fourier and/or Fast Fourier transform analysis. Rhythmic motion may be unintended and/or substantially rhythmic or periodic patterns of sufficient temporal duration. The computing device may be configured to identify a motion or pattern as rhythmic only if a predetermined frequency threshold is exceeded and/or a predetermined time duration threshold is exceeded for a periodic pattern. The predetermined frequency threshold value and the predetermined time duration threshold value may be different from those determined earlier in step 610; however, the techniques used in step 610 may be used here to determine the threshold values.

In further embodiments, the z positional component, of the of the filtered 3D user motion input, may comprise pressure data based on contact pressure. In some embodiments, the pressure data might be associated with a touchscreen device that may be connected to or monitored by the motion capture device 119 (306). For example, the x and y positional components may represent motion across the surface of a touchscreen, and the z positional component may represent contact pressure motion on a touchscreen. The same frequency domain processing techniques may be applied to the analysis of the filtered 3D user motion, where the z positional component is pressure data, e.g. where the received 3D user motion comprises 2D position information and pressure data. In this case, frequency domain or frequency response analysis may be conducted on the contact pressure data to determine the presence of residual rhythmic motion.

In step 626, if the computing device does not detect the presence of residual rhythmic motion in the filtered 3D user motion input, then at step 627, the computing device may (1) further process the filtered 3D user motion in accordance with step 636 and (2) also determine if the stored filter needs reduction, e.g. widening or weakening for use during the next iteration of this algorithm. Even though the rhythmic motion was successfully suppressed and there are no residual rhythmic motions present, this reduction step may account for over-compensation or over-correction by the filter. Regarding over compensation, the user's tremor may change with age, thus changing the frequency associated with the user's past tremor. As a result, the cutoff frequency of the stored filter may be relatively far from the actual tremor frequency. Regarding over-correction, the stored filter may be a result of an over-correction for a user's tremor. In either case, the stored filter in the user profile may be unnecessarily strong and may be suppressing a larger signal range than is necessary to protect against the rhythmic motion. This may result in signal waste. The unnecessary loss of signal may hinder some applications because the lost signal space may have been carrying valuable information regarding, for example, the user, the operation of the application, other objects observed by the one or more sensors, or any other information that may have been embedded in the signal. In such cases, the computing device may widen the filter, e.g. reduce the filter, or reduce the effects of the filter, by incrementally expanding the cutoff frequency to allow more of the signal to pass while still suppressing the rhythmic motion.

Figure 5C:
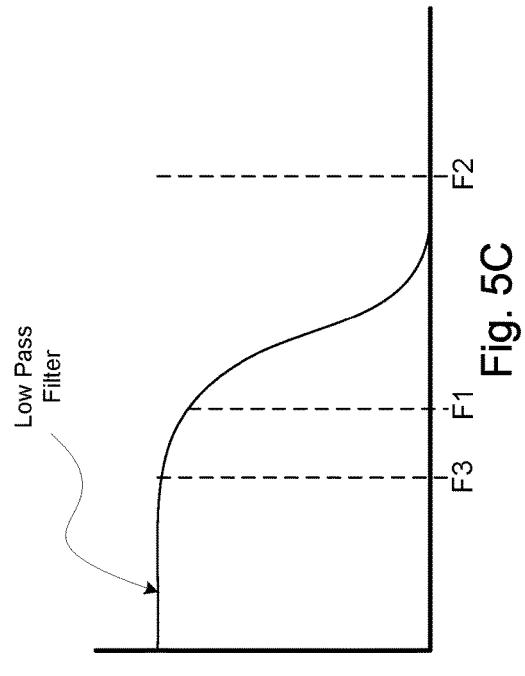
FIG. 5C illustrates an example residual tremor falling within a filter's passband.
Figure 5B:
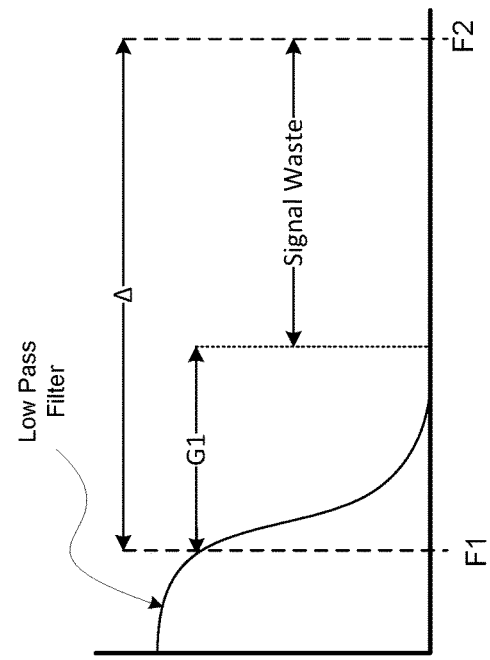
FIG. 5B illustrates an example of signal waste.

For example, at step 627, to determine if the stored filter needs to be reduced, e.g. widened, the computing device may compare the frequency of the rhythmic motion (F2 of FIG. 5B) to the furthest filter cutoff frequency (F1 of FIG. 5B) to determine the difference. In other words, the computing device determines the filter that is furthest from the rhythmic motion in the frequency domain, and then calculates the difference between the frequency of the rhythmic motion and the cutoff frequency of that furthest filter. If the difference between the two frequencies ($\Delta$ of FIG. 5B) is greater than a predefined guard value (G1 of FIG. 5B), then there may be signal waste as depicted in FIG. 5B. In such case, the cutoff frequency "F1" may be modified in order to reduce the effects of the filter. This modification may be accomplished by automatically decreasing the difference "$\Delta$" between the two frequencies by a predefined fraction of the predefined guard value "G1." In other words, the stored filter may be unnecessarily strong and may be suppressing a greater signal range than is necessary to protect against the rhythmic motion. In such an example, the computing device may widen the filter, e.g. reduce the filter, or reduce the effects of the filter, by incrementally expanding or increasing the cutoff frequency to allow more of the signal to pass while still suppressing the rhythmic motion. The reduction process may be iteratively repeated until the frequency of the rhythmic motion "F2" is within a predefined distance from the guard value "G1." At step 629, the reduced filter may be stored in the user profile to be used as the "stored filter" during the next iteration of this algorithm.

In another embodiment, the reduced filtered may be immediately applied to the original received 3D user motion input in order to generate the filtered 3D user motion input, which would then be processed at step 636.

Step 627 is an optional step that is not required to carry-out the filtering steps herein. Also, step 627 may be performed in conjunction with any of the filtering steps disclosed herein and/or at any time before the filtered motion input is transmitted and/or processed by step 636. In addition, step 627 may be performed with step 636. For example, step 627 may be performed after step 618 and/or step 634.

After storing the reduced filter in the user profile, the computing device may transmit the filtered 3D user motion to step 636, where the computing device will send the appropriate transmission to the application in accordance with the method described early in step 636. Then the system may return to step 608 to begin the process again.

Returning to step 626, after applying the stored filter from the user profile, the computing device may detect the presence of residual rhythmic motions. This situation may occur if the user's tremors change in such a way as to bring the frequency of the tremor within the pass band of the stored filter. This example is depicted in FIG. 5C, where the stored filter is a low pass filter with cutoff frequency "F1" designed to protect against the user's original tremors occurring at frequency "F2." However, in this example, the user may have taken prescribed medications which weakened the tremor, lowering it to a frequency "F3." As shown in FIG. 5C, the frequency "F3" of the residual tremor falls within the pass band of the low pass filter, thus rendering the filter ineffective.

In step 626, if the computing device detects that residual tremors still remain in the filtered 3D user motion input, then the system may (at step 628) update the stored filter, and (at step 630) replace the stored filter with the updated filter in the user profile, and then (at step 632) apply the updated filter to the filtered 3D user motion input. Within step 632, the computing device may iteratively check to see if residual tremors remain, and may iteratively apply a stronger filter, and keep doing so until the filter has adjusted to the point that no further residual tremors remain. The computing device may then transmit the resulting filtered 3D user motion to step 636, where the computing device will send the appropriate transmission to the application in accordance with the method described early in step 636. Then the system may return to step 608 to begin the process again.

In step 628, in some embodiments, the stored filter may be updated by modifying its filter range, e.g. the range of the stored filter is modified to suppress the frequency of the newly detected residual tremor. For example, if the stored filter was a low pass filter, then its cutoff frequency may be modified to ensure that the frequency of the residual or remaining tremor is suppressed or removed from the pass band of the filter.

In other embodiments, the stored filter is updated by determining the average frequency (in Hz) of the previously targeted or original rhythmic motion (associated with the stored filter) and the current residual rhythmic motion, e.g. the computing device finds the average of the frequency of the original rhythmic motion and the frequency of the residual rhythmic motion. After determining the average frequency, the computing device may modify the stored filter accordingly. For example, if the stored filter is a low pass filter, then the cutoff frequency will be automatically modified by the computing device to ensure that the average frequency is suppressed. By modifying the stored filter by the average frequency, the filter updating process is less proportional and more incremental, thus lessening possible undesired effects of over-corrections. In further embodiments, the computing device modifies the stored filter by a predetermined fraction of the average frequency in order to further lessen possible effects of over-correction by applying a more gradual correction.

Returning to step 620, the computing device may determine that the user profile does not contain a stored filter. Then, in step 624, the computing device may determine a filter based on the frequency (in Hz) of the rhythmic motion in the received 3D user motion input (as determined in step 610). As such, the computing device may select a filter that will suppress the rhythmic motion determined in step 610. In step 630, the filter may be assigned to the user profile as the stored filter, which will be used during the next iteration of this algorithm. In step 632, the computing device may apply the filter to the received 3D user motion input to suppress the rhythmic motion and generate filtered 3D user motion input. As discussed earlier, user bias correction may also be applied as described in step 634. Then, the computing device may transmit the filtered 3D user motion to step 636, where the computing device will send the appropriate transmission to the application in accordance with the method described early in step 636. Then the system may return to step 608 to begin the process again.

Returning to step 614, the computing device may determine, based on the factors or combination of factors illustrated earlier in step 612, that the processing threshold was met and/or exceeded. In that case the received 3D motion may be processed remotely by a location that possesses greater processing capabilities and/or may be sent for additional and/or supplemental processing by another local computing device. For ease of illustration, the following concepts will be described using a remote location which may possess a second computing device to carry out the required rhythmic motion suppression and/or elimination. The filters used by the second computing device may be different from the filters used by the local computing device, e.g. the first computing device.

In step 614, if the first computing device determines that the processing threshold was met, satisfied and/or exceeded, then the first computing device transmits the received 3D user motion input to the second computing device at step 716. Hereinafter in discussing FIG. 7, the second computing device is referred to as the "computing device" for ease of description.

In step 716 of FIG. 7, the computing device may recognize that the application being run used rhythmic gesture commands for which a default filter was determined (see optional step 606). In step 718, the computing device may apply the default filter to the received 3D user motion input. The filter may suppress the detected rhythmic motion thus generating a filtered 3D user motion input.

In step 734, the computing device may apply a bias correction to the filtered 3D user motion input, based on a user bias. As describes earlier (in step 634) the computing device (in this case the second computing device) may access a user database, based on (for example) the optional user recognition discussion at step 608, to determine whether a user bias value is stored for the general type of motion exhibited by the filtered 3D user motion input. If a user bias value is stored in the user profile for this general type of motion, then the computing device may apply the user bias value to the filtered 3D user motion input in order to create a refined 3D user motion input. Note: As described earlier in step 634, the computing system may categorize motions into general types, such as horizontal, vertical, depth, and/or other appropriate types of motions. Further, the user database may store user bias values based on the general types. Thus, each general type of motion may have different user bias values.

However, if a user bias value is not stored in the user database, then the computing device may (1) continue processing the filtered 3D user motion in accordance with step 736, and (2) also determine a user bias value to be used for the next iteration of this algorithm. To determine the user bias, the computing device may perform the same method as described earlier in step 634.

Step 734 (Applying Bias Correction) is an optional step that is not required to carry-out the filtering steps herein. Also, step 734 may be performed in conjunction with any of the filtering steps described herein and at any time before the filtered motion input is transmitted and/or processed by step 736. Also, step 734 may be performed with step 736. For example, step 734 may be performed after step 729 and/or after step 732 and/or any time prior to or in conjunction with step 736.

In step 736, the computing device may determine the type of input required by the application being run. In other words, the computing device may determine whether the application only requires 3D user motion input, or actual command inputs determined from the 3D user motion input, or both. This is accomplished using the same methods described earlier in step 636. After the appropriate transmission is made to the application, then the system may return to step 608 to begin the process again.

Returning to step 716, the computing device may recognize that the application being run may not use rhythmic gesture commands (see optional step 606) and or step 606 was disabled or is not in use.

In step 720, the computing device may determine that a stored filter exists for the user in a user profile. The determination that a stored filter is associated with a user profile may be based on the system successfully recognizing the identity of the user. The identity of the user may be obtained in several ways, for example, by way of the optional discussion in step 608.

In some embodiments, the user profile may be based on access to a database containing the user's medical history and other user information, such as age. The computing device may determine that, if this medical database was not previously accessed for this user (e.g. as long as this is the first time that this medical database is accessed regarding this user), then the stored filter may be determined based on access to this medical database. Otherwise, if this medical database was previously accessed by the computing device for this user, then the stored filter may be based on a filter already stored in a different user profile. However, in other embodiments, the database containing the user's medical information and other user information may be accessed without restriction.

In some embodiments, if the user profile is based on access to the database containing the user's medical history and age, then the computing device may determine that the user is of a particular age and may suffer from a particular medical condition which is associated with tremors or rhythmic motions. The medical condition may be, for example, Parkinson's disease, essential tremors, cerebellar disease, alcohol withdrawals, or the like. With the user's medical condition and age, the computing device may access a database which contains general filters for each medical condition according to age and/or other criteria. The computing device may select the stored filter from this database based on the user's medical condition and age.

In step 722, the computing device may apply the stored filter to the received 3D user motion input in order to suppress the rhythmic motion identified in step 610 and to generate filtered 3D user motion input.

In step 726, after applying the stored filter, the computing device may use the same frequency domain analysis techniques described earlier in step 626 to determine if rhythmic motions are still present.

In step 726, if the computing device does not detect the presence of residual rhythmic motions in the filtered 3D user motion input, then at step 727, the computing device may (1) further process the filtered 3D user motion input in accordance with the techniques of step 736, and (2) also determine if the stored filter needs reduction, e.g. widening, for use during the next iteration of this algorithm. In order to determine if filter reduction may be necessary and to execute the filter reduction, the computing device may use the same techniques as described earlier in step 627.

For example, the stored filter of FIG. 8A could be described as having two components: a low pass component with a cutoff frequency "F1" (in Hz) and a band pass component with cutoff frequency "F3." In addition, a rhythmic motion may occur at a frequency "F2." The computing device may calculate the frequency distance "Δ1" between the frequency of the rhythmic motion "F2" and the low pass cutoff frequency "F1." The computing device may then determine the frequency distance "Δ2" between "F2" and the band pass cutoff frequency "F3." As depicted in FIG. 8A, the frequency distance "Δ1" may be greater than the frequency distance "Δ2." Thus, the computing device may determine that the low pass component may be the furthest filter component from the frequency of the rhythmic motion.

In accordance with the method outlined earlier in step 627, the computing device (e.g. the second computing device) may determine if the frequency distance "Δ1" between the frequency of the rhythmic motion "F2" and the cutoff frequency of the furthest filter component "F1" is greater than a predefined guard value (G1 of FIG. 8A). If so, then signal waste may exist as depicted in FIG. 8A. In such case, the cutoff frequency "F1" may be modified in order to reduce the effects of the filter. In this example, this modification may be accomplished by automatically decreasing the difference "Δ1" between the "F1" and "F2" by a predefined fraction of the predefined guard value "G1." In this example, the computing device may widen the low pass filter component, e.g. reduce the filter, or reduce the effects of the filter, by incrementally expanding or increasing the cutoff frequency "F1" to allow more of the signal to pass while still suppressing the rhythmic motion. The reduction process may be iteratively repeated until the frequency of the rhythmic motion "F2" is within a predefined distance from the guard value "G1." At step 729, the reduced filter may be stored in the user profile and be used as the "stored filter" during the next iteration of the system algorithm when the next 3D user motion input is received.

In another embodiment, the reduced filtered may be immediately applied to the original received 3D user motion input in order to generate the filtered 3D user motion input, which would then be processed at step 736.

Step 727 is an optional step that is not required to carry-out the filtering steps herein. Also, step 727 may be performed in conjunction with any of the filtering steps disclosed herein and/or at any time before the filtered motion input is transmitted and/or processed by step 736. In addition, step 727 may be performed with step 736. For example, step 727 may be performed after step 718 and/or step 734.

After storing the reduced filter in the user profile, the system may proceed to step 736, where the computing device will send the appropriate transmission to the application in accordance with the method described early in step 736. Then the system may return to step 608 to begin the process again.

Returning to step 726, after applying the stored filter from the user profile, the computing device may detect the presence of residual rhythmic motions. This situation may occur if the user's tremor changes in such a way as to bring the frequency of the tremor within the pass band of the stored filter. For example, the user's tremors may worsen with age. This example is depicted in FIG. 8B, where the stored filter may contain a low pass component with cutoff frequency "F1," and a band pass component with a center frequency "F2," a lower cutoff frequency "C1" and an upper cutoff frequency "C2." In addition, the user's original tremor may previously have occurred at frequency "F3" as shown in FIG. 8B. However, in this example, the user's tremors may have worsened with age. As a result, the user's tremors may now be occurring at a higher frequency "F4," which may fall within the pass band of the stored filter as shown in FIG. 8B, thus rendering the filter ineffective.

In step 726, if the computing device detects that residual tremors still remain in the filtered 3D user motion input, then the system may (at step 728) update the stored filter, and (at step 730) replace the stored filter with the updated filter in the user profile, and then (at step 732) apply the updated filter to the filtered 3D user motion input. Within step 732, the computing device may iteratively check to see if residual tremors remain, and may iteratively apply a stronger filter, and keep doing so until the filter has adjusted to the point that no further residual tremors remain. The system may proceed to step 736, where the computing device will send the appropriate transmission to the application in accordance with the method described early in step 736. Then the system may return to step 608 to begin the process again.

In step 728, in some embodiments, the stored filter is updated by modifying the passband of the stored filter to suppress the residual rhythmic motion. In the example illustrated by FIG. 8B, the pass band of the band pass component may be modified to suppress the residual rhythmic frequency "F4."

In other embodiments, the stored filter is updated by determining the average frequency of the original rhythmic motion "F3" and the current residual rhythmic motion "F4," e.g. the computing device finds the average of the frequency of the original rhythmic motion "F3" and the frequency of the residual rhythmic motion "F4." After determining the average frequency, the computing device may modify the passband of the stored filter according to the average frequency. By modifying the stored filter by the average frequency, the filter updating process is less proportional and more incremental, thus lessening possible undesired effects of possible over-corrections. In further embodiments, the computing device may modify the stored filter by a predetermined fraction of the average frequency in order to further lessen possible effects of over-correction and to achieve a more gradual tuning of the filter.

In still further embodiments, in step 728, the computing system may use the filter reducing techniques of step 727 to widen the filter with the furthest cutoff frequency from the frequency "F4" of the residual rhythmic motion. In the example of FIG. 8B, the low pass filter may be widened to reduce signal waste. This filter reduction step may be performed in accordance with the techniques described earlier in step 727.

Returning to step 720, the computing device may determine that the user profile does not contain a stored filter. In step 724, the computing device may select a filter based on the frequency of the rhythmic motion in the received 3D user motion input as determined in step 610. As such, the computing device (e.g. the second computing device) may select a filter that will suppress the rhythmic motion determined in step 610. In step 730, the filter may be assigned to the user profile as the stored filter, which will be used during the next iteration of this algorithm. In step 732, the computing device may apply the filter to the received 3D user motion input to suppress the rhythmic motion and generate filtered 3D user motion input. As discussed earlier, user bias correction may also be applied as described in step 734. Then, the system may proceed to step 736, where the computing device will send the appropriate transmission to the application in accordance with the method described early in step 736. Then the system may return to step 608 to begin the process again.

Returning to FIG. 6, in further embodiments, the computing device may execute an environmental cleanup function that removes and/or suppresses motion created, generated and/or inserted by a moving environment (such as a car), regardless of whether the environmental motion is rhythmic or non-rhythmic. In some embodiments, a motion capture device (e.g. a 3D motion camera) may be located in or operatively attached to a wireless device 116. For example, the wireless device 116 may be a tablet with a touchscreen that serves as the 3D motion capture device, wherein the 3D motion comprises 2D position data plus pressure data from the touchscreen. The wireless device 116 may be in a moving environment, such as a terrestrial, subterranean, nautical, aerial, space or other type of moving vehicle, which may be injecting noise or motion into the system. For example, a user may be operating the touchscreen of a tablet device, such as an electronic navigation device, while in a moving car. The movement of the car may cause the user's finger to jerk and/or appear unsteady. The embodiments described below describe ways to suppress and/or remove the vehicle motion from received 3D user motion input signal used by the electronic navigation device, and/or any other motion capture device.

In some embodiments, the vehicle may be outfitted with several motion sensors, pressure sensors, mechanical and/or ultrasonic anemometers, gyroscopic sensors, accelerometers and/or other sensors to measure how the vehicle reacts (e.g. how the vehicle moves) when one or more different forces act upon it. For example, an aircraft may be outfitted with several motion sensors and/or other environmental sensors to record and/or capture data regarding how the aircraft moves in relation to internal and external input and/or forces. The internal forces may include any factors internal to the aircraft that may create motion in the vehicle, such as the movement of fluid, people, weight shifts, and/or steering and/or throttle commands from the pilot. The external forces may include environmental factors that may create motion in the vehicle, such as wind, rain, uneven terrain when moving on the ground, updrafts, pressure differentials, etc. Similar sensors may be adapted in similar ways for other types of vehicles.

In one embodiment, while the vehicle is in motion, the computing device may use the sensor arrays to record how the vehicle reacts and/or moves in relation to the various factors that may influence it, e.g. in relation to the various internal and/or external forces that may be impacting the vehicle as recorded by the sensor arrays. The computing device may correlate the movement of the vehicle with the data from the various sensor arrays to generate a substantially complete and/or partial mathematical transfer function which models how the vehicle moves and/or reacts in relation to specific inputs, e.g. the internal and/or external forces discussed above. With the transfer function and/or approximate transfer function representation of the vehicle, the computing device may then use the input from the sensor arrays to predict the motion of the vehicle. This vehicle predicted motion may be filtered and/or removed from the received 3D user motion input, thus providing a clean signal to the motion capture device. In other embodiments, the computing device may use the vehicle's onboard radar or camera arrays to survey the terrain ahead of the vehicle. By doing so, the computing device can use vehicle's transfer function to predict the vehicle's motion before the sensor's encounter the terrain. Thus, the computing device may provide near instantaneous environmental motion corrections to the received 3D user motion input, providing an improved user experience.

Figure 9:
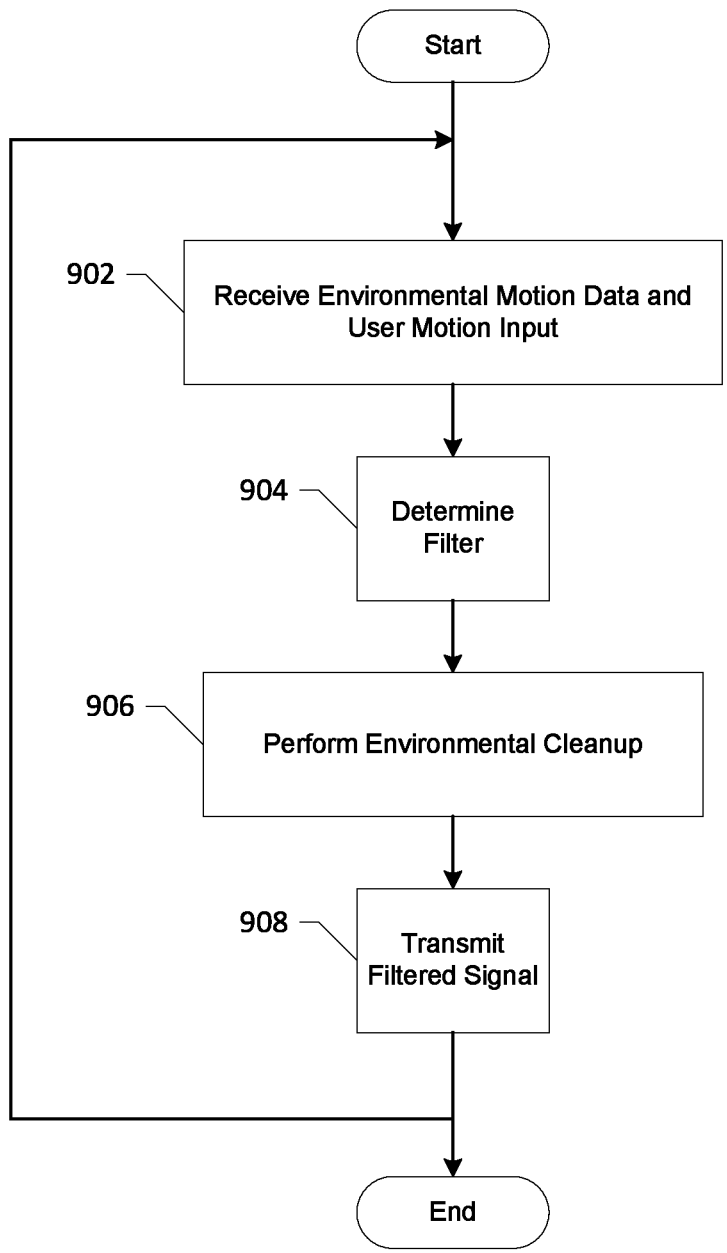
FIG. 9 illustrates an example method for implementing various features described herein.

In another embodiment, the computing device may use the sensor arrays described earlier to filter out the actual movement of the vehicle. FIG. 9 illustrates an example method, apparatus or system for performing the environmental cleanup function of filtering out the actual movement of the vehicle. Any of the environmental cleanup embodiments described in this document are optional and may be performed separate from and/or in conjunction with the embodiments described in FIG. 6 and/or FIG. 7 of this disclosure. For example, the environmental cleanup may be performed before steps 614 and/or 714.

At step 902, the computing device may receive a first signal comprising the vehicle's environmental motion data, e.g. 3D environmental motion data, which may have been tracked by a motion tracking device, such as one of the sensors described above. In addition, the computing device may receive a second signal comprising both the vehicle's 3D environmental motion and the 3D user motion input, e.g. user's 2D position data plus pressure motion from a touchscreen device, received 3D user motion input, and/or filtered 3D user motion input, etc. It may be desired to remove the vehicle's 3D environmental motion data from the second signal in order to obtain only the 3D user motion input.

At step 904 and step 906, the computing device may determine and then apply a filter which is based on the 3D environmental motion data of the vehicle in the first signal. In one embodiment, the computing device may determine a filter that may be the inverse of the environmental motion data. This filter may be applied to the second signal. For example, the environmental motion data may comprise x, y and z directional components for predetermined time intervals. The computing device may use a filter that may temporally align the first and second signals and then subtract the x, y and z directional components of the environmental motion data from those of the second signal, leaving only the directional components of the 3D user motion input. These steps may be repeated for signals received by several sensors.

In another embodiment, the computing device may perform frequency analysis on the first signal to determine at which frequencies the environmental motion may appear. The same frequency analysis may be performed on the second signal. Because the second signal may be a combination of the 3D user motion input and the 3D environmental motion data, if the two sets of motions happen to appear at the same frequency, their signal strengths will add together at that frequency. Using the frequency data of the first signal and/or second signal, the computing device may determine a filter that may be designed to suppress and/or remove the frequency components of the 3D environmental motion data while retaining the frequency components of the 3D user motion input. This filter may be applied to the second signal in order to suppress and/or remove the 3D environmental motion. In doing so, the frequencies that exhibit only the first signal may be filtered out. For frequencies that exhibit both sets of motions, the components of the first signal will be removed from the second signal at those frequencies, leaving only the 3D user motion input. At step 908, the resulting filtered signal is transmitted by the computing device to the application being run on the system. The process then returns to step 902 to receive the next iteration of signals. These steps may be repeated for signals received by several sensors.

In still other embodiments, a gyroscopic sensor and/or an accelerometer may be operatively attached to the motion capture device in order to record sudden motions, e.g. motions that exceed and/or satisfy a predetermined motion threshold or acceleration threshold. These motions may correspond to unintended or unexpected environmental motion shifts, such as those experienced by a terrestrial vehicle traveling over uneven terrain. The computing device may remove these environmental motions from the received 3D user motion input.

Returning to step 614, if the local computing device, e.g. the first computing device, possesses sufficient processing power to carry out all of the required filtering, signal processing, and/or application processing of this disclosure with minimal impact to the user experience, then step 614 and step 612 are optional and/or not required. In such a situation, all of the steps outlined throughout this disclosure may be performed by the first computing device. For example, in such a situation all of the steps described in FIG. 6 and/or FIG. 7 may be performed by the local computing device, e.g. the first computing device.

Returning to step 610, after using frequency analysis techniques to detect the presence of rhythmic motion in the received 3D user motion input, the computing device may use the techniques of step 634 to determine the general type of motion exhibited by the user. See step 634 for a description of the general types of motions. Then the computing device may store the detected rhythmic motion with its corresponding general motion type in a user profile. For example, the computing device may determine that a user exhibits a 3D tremor at a specific frequency and/or frequency range when trying to perform a vertical downward type motion. The tremor frequency and respective motion type may be stored in the user profile. Then, the computing device may cancel the detected rhythmic motion from the received 3D user motion input using, for example, a cancellation signal. The cancellation signal may be of a magnitude and/or signal strength equal to a predetermined fraction of the original tremor magnitude and/or signal strength. In addition, for future received 3D user motion inputs from the same user, if the computing device detects a tremor, then the computing device may use the stored motion type and respective rhythmic motion data in the user's profile to generate and/or apply a cancellation signal as described above.

Although example embodiments are described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

We claim:

1. A method comprising:
   detecting, by a first computing device, a tremor in motion input obtained by one or more sensors;
   determining, by the first computing device, whether to filter the obtained motion input, wherein the determining is based on:
   one or more frequencies corresponding to predefined rhythmic gestures of valid user commands used by an application, and
   a frequency of the detected tremor;
   determining, by the first computing device, that a processing threshold has been satisfied, wherein the processing threshold is established based on a frequency of a rhythmic gesture command being higher than the frequency of the detected tremor;
   sending, to a second computing device, a request for rhythmic filtering to suppress the detected tremor and generate a filtered motion input;
   receiving, from the second computing device, the filtered motion input; and
   transmitting, by the first computing device and based on a comparison of the filtered motion input with the one or more frequencies, one or more user commands to the application.

2. The method of claim 1, wherein detecting the tremor comprises:
   determining that a pattern in the obtained motion input satisfies one or more predefined threshold values comprising at least a time value, a frequency value, or a combination thereof.

3. The method of claim 1, wherein the one or more user commands comprise commands to manipulate virtual reality objects in virtual three dimensional space.

4. The method of claim 1, further comprising:
   determining, by the first computing device, an application type of the application, wherein the application is executed on the first computing device;
   determining, based on the application type, a plurality of user commands for the application that are associated with rhythmic patterns; and
   retrieving, by the first computing device, a plurality of frequencies associated with the plurality of user commands.

5. The method of claim 1, further comprising:
   selecting a stored filter from a user profile; and
   after determining that residual unintended rhythmic motion is present in the filtered motion input:
   updating the stored filter; and
   filtering the filtered motion input using the updated filter to generate a second filtered motion input.

6. The method of claim 1, wherein the obtained motion input comprises three dimensional position data associated with one or more tracked objects that are attached to one or more portions of a user's body.

7. The method of claim 1, further comprising:
   accessing a user profile to determine one or more medical conditions associated with a user;
   determining, by the first computing device, a stored filter based on the one or more medical conditions;

filtering the filtered motion input using the stored filter to generate a second filtered motion input; and transmitting, based on the second filtered motion input, a signal indicating one or more user commands.

8. A method comprising:

determining, by a first computing device, a first frequency corresponding to a predefined rhythmic gesture of a valid user command used by an application;

detecting, by the first computing device, a tremor in motion input obtained by one or more sensors;

determining, by the first computing device, that a processing threshold has been satisfied, wherein the processing threshold is established based on the predefined rhythmic gesture occurring at a higher frequency than the detected tremor;

sending, to a second computing device, a request for rhythmic filtering to suppress the detected tremor and generate a first filtered motion input; and transmitting, by the first computing device and based on a comparison of the first filtered motion input with the first frequency, at least a first command to the application.

9. The method of claim 8, wherein the obtained motion input comprises an input user bias, the method further comprising:

determining, by the first computing device and based on the obtained motion input, an intended gesture;

detecting, by the first computing device and based on the intended gesture, the input user bias; and filtering, by the first computing device, the obtained motion input to correct the input user bias.

10. The method of claim 8, wherein detecting the tremor further comprises:

determining, by the first computing device, a presence of the tremor based on a frequency of a periodic pattern in the obtained motion input satisfying a predefined temporal threshold and a predefined frequency threshold.

11. The method of claim 8, wherein the processing threshold is further established based on a threshold number of users.

12. The method of claim 8, further comprising:

selecting, by the first computing device and based on user identification information, a stored filter;

updating the stored filter, and filtering the first filtered motion input using the updated filter to generate a second filtered motion input, wherein updating the stored filter is based on a determination that residual unintended rhythmic motion is present in the first filtered motion input; and transmitting, based on the updated second filtered motion input, a signal indicating one or more user commands.

13. The method of claim 12, wherein selecting the stored filter based on the user identification information comprises:

accessing a user profile to determine one or more medical conditions and an age of a user; and determining, by the first computing device and based on the one or more medical conditions and the age of the user, the stored filter.

14. The method of claim 1, further comprising:

determining, by the first computing device, a user;

selecting, by the first computing device and based on the user, a stored filter from a user profile; and after determining that residual unintended rhythmic motion is not present in the filtered motion input:

reducing, based on a predefined value, a strength of the stored filter to generate a reduced filter, and storing the reduced filter in the user profile.

15. The method of claim 8, wherein the obtained motion input comprises a horizontal gesture, the method further comprising:

determining, based on the obtained motion input, the horizontal gesture;

detecting unintended vertical movement within the obtained motion input; and filtering the obtained motion input to correct the unintended vertical movement.

16. A system comprising:

a first computing device comprising; and a second computing device;

wherein the first computing device comprises:

one or more first processors; and memory storing first computer readable instructions that, when executed by the one or more first processors, cause the first computing device to:

detect a tremor in motion input obtained by one or more sensors;

determine whether to filter the obtained motion input, wherein the determining is based on:

one or more frequencies corresponding to predefined rhythmic gestures of valid user commands used by an application, and a frequency of the detected tremor;

determine that a processing threshold has been satisfied, wherein the processing threshold is established based on a frequency of a rhythmic gesture command being higher than the frequency of the detected tremor;

send, to the second computing device, a request for rhythmic filtering; and transmit, based on a comparison of a filtered motion input with the one or more frequencies, one or more user commands to the application;

wherein the second computing device comprises:

one or more second processors; and memory storing second computer readable instructions that, when executed by the one or more second processors, cause the second computing device to:

filter, by using a first filter to suppress the detected tremor and generate the filtered motion input, the obtained motion input; and transmit, to the first computing device, the filtered motion input.

17. The system of claim 16, wherein the second computer readable instructions, when executed by the one or more second processors, further cause the second computing device to:

select the first filter based on a user profile.

18. The system of claim 16, wherein the second computer readable instructions, when executed by the one or more second processors, further cause the second computing device to:

after determining that residual unintended rhythmic motion is present in the filtered motion input:

update the first filter; and filter the filtered motion input using the updated first filter to generate a second filtered motion input.

19. The system of claim 16, wherein the second computer readable instructions, when executed by the one or more second processors, further cause the second computing device to:

select, based on a user profile, the first filter; and after determining that residual unintended rhythmic motion is not present in the filtered motion input:

reduce, based on a predefined value, a strength of the first filter to generate a reduced filter, and
store the reduced filter in the user profile.

\* \* \* \* \*

UNITED STATES PATENT AND TRADEMARK OFFICE
CERTIFICATE OF CORRECTION

| | |
|---|---|
| PATENT NO. | : 10,429,935 B2 |
| APPLICATION NO. | : 15/017979 |
| DATED | : October 1, 2019 |
| INVENTOR(S) | : Hall et al. |

It is certified that error appears in the above-identified patent and that said Letters Patent is hereby corrected as shown below:

In the Specification

Detailed Description, Column 8, Line 27:
Delete "HTMLS," and insert --HTML5,--

Detailed Description, Column 20, Line 54-55:
Delete "of the of the" and insert --of the--

In the Claims

Claim 15, Column 32, Line 7:
After "and", insert --¶--

Signed and Sealed this
Ninth Day of August, 2022

*Katherine Kelly Vidal*

Katherine Kelly Vidal
*Director of the United States Patent and Trademark Office*